(12) United States Patent
Farhadi et al.

(10) Patent No.: US 10,144,459 B2
(45) Date of Patent: Dec. 4, 2018

(54) SIGHTSEEING TOURING VEHICLE WITH THEATER

(71) Applicant: Kamrouz Farhadi, Beverly Hills, CA (US)

(72) Inventors: Kamrouz Farhadi, Beverly Hills, CA (US); Robert Marcum Haswell, Aurora, MO (US)

(73) Assignee: Kamrouz Farhadi, Beverly Hills, CA (US)

( * ) Notice: Subject to any disclaimer, the term of this patent is extended or adjusted under 35 U.S.C. 154(b) by 0 days.

(21) Appl. No.: 15/256,314

(22) Filed: Sep. 2, 2016

(65) Prior Publication Data

US 2017/0174269 A1 Jun. 22, 2017

Related U.S. Application Data

(60) Provisional application No. 62/214,637, filed on Sep. 4, 2015.

(51) Int. Cl.
*B62D 25/06* (2006.01)
*B62D 31/02* (2006.01)
*B60P 3/025* (2006.01)
*B62D 47/02* (2006.01)

(52) U.S. Cl.
CPC ............ *B62D 31/02* (2013.01); *B60P 3/0252* (2013.01); *B62D 47/02* (2013.01)

(58) Field of Classification Search
CPC ........ B62D 31/02; B62D 47/02; B62D 25/06; B60P 3/0252
See application file for complete search history.

(56) References Cited

U.S. PATENT DOCUMENTS

| 6,685,257 | B1 * | 2/2004 | Beland | B60N 3/026 |
| | | | | 280/728.1 |
| 2005/0227539 | A1 * | 10/2005 | Timmermans | B62D 31/02 |
| | | | | 439/607.41 |
| 2007/0182217 | A1 * | 8/2007 | Saleen | B62D 25/06 |
| | | | | 296/215 |

FOREIGN PATENT DOCUMENTS

| JP | 2009137558 | A | * | 6/2009 | |
| KR | 20030059728 | A | * | 7/2003 | B60P 3/0252 |
| WO | WO-0076807 | A1 | * | 12/2000 | B60P 3/0252 |
| WO | WO-2008145407 | A1 | * | 12/2008 | B60N 2/01 |
| WO | WO-2011088095 | A1 | * | 7/2011 | B60N 2/01 |

\* cited by examiner

*Primary Examiner* — Lori L Lyjak
(74) *Attorney, Agent, or Firm* — Milord A. Keshishian

(57) ABSTRACT

The present invention discloses a sightseeing-touring vehicle with theater that has open plan architecture with wide openings (windows) that surround the sightseeing-touring occupants. The open-space architecture provides optimal views of surrounding sights, including a view of a large video display while maintaining all the creature comforts of a conventional vehicle for patrons inside.

19 Claims, 38 Drawing Sheets

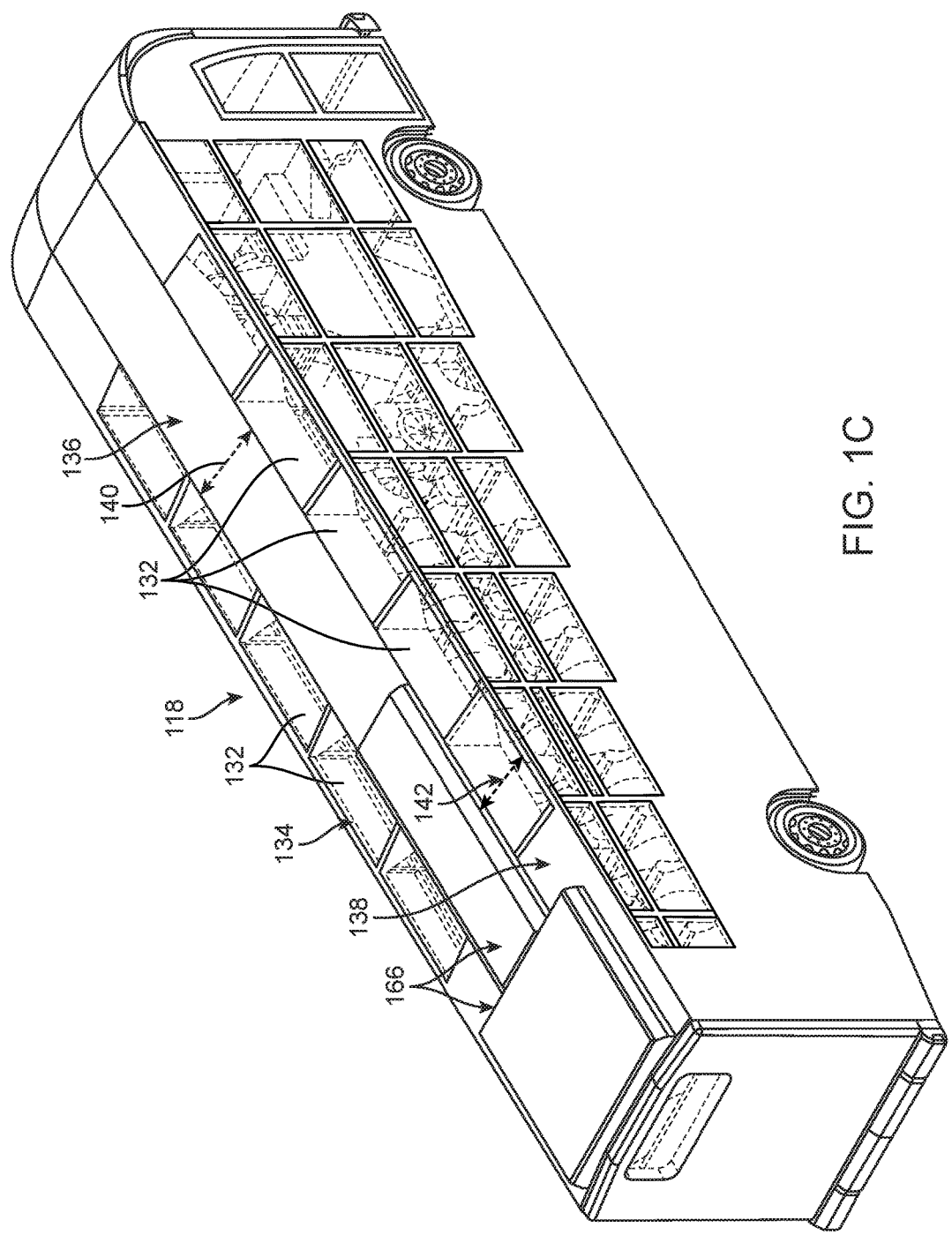

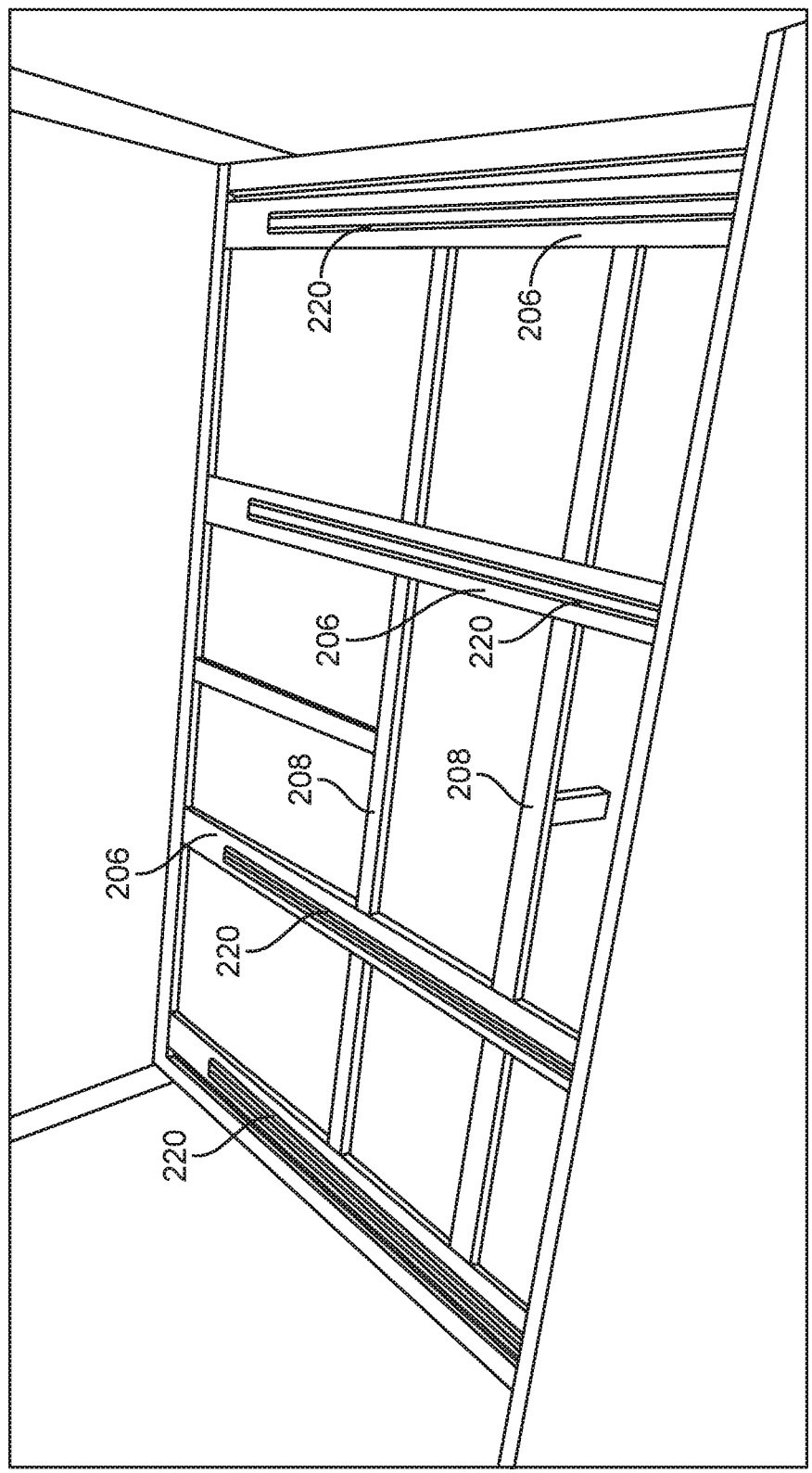

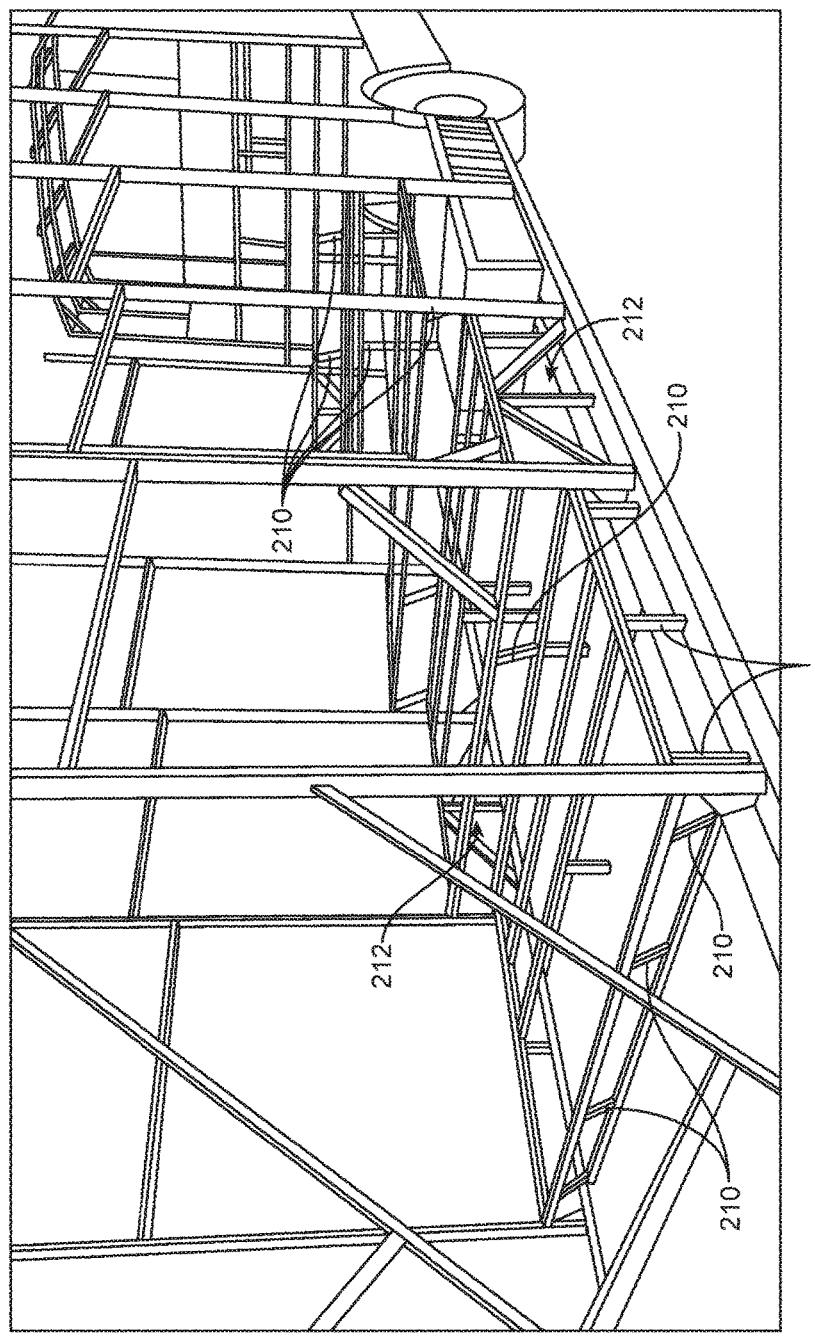

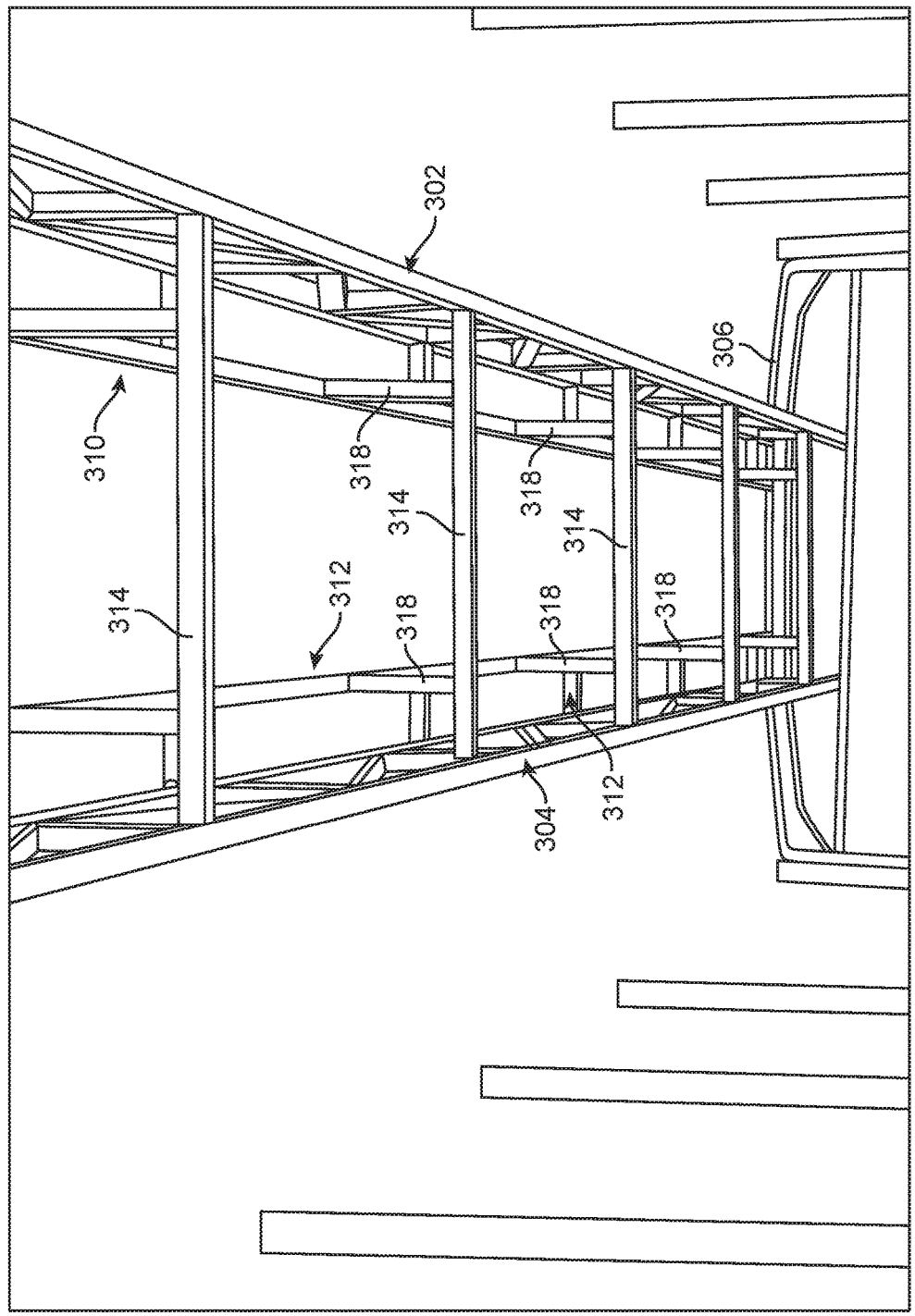

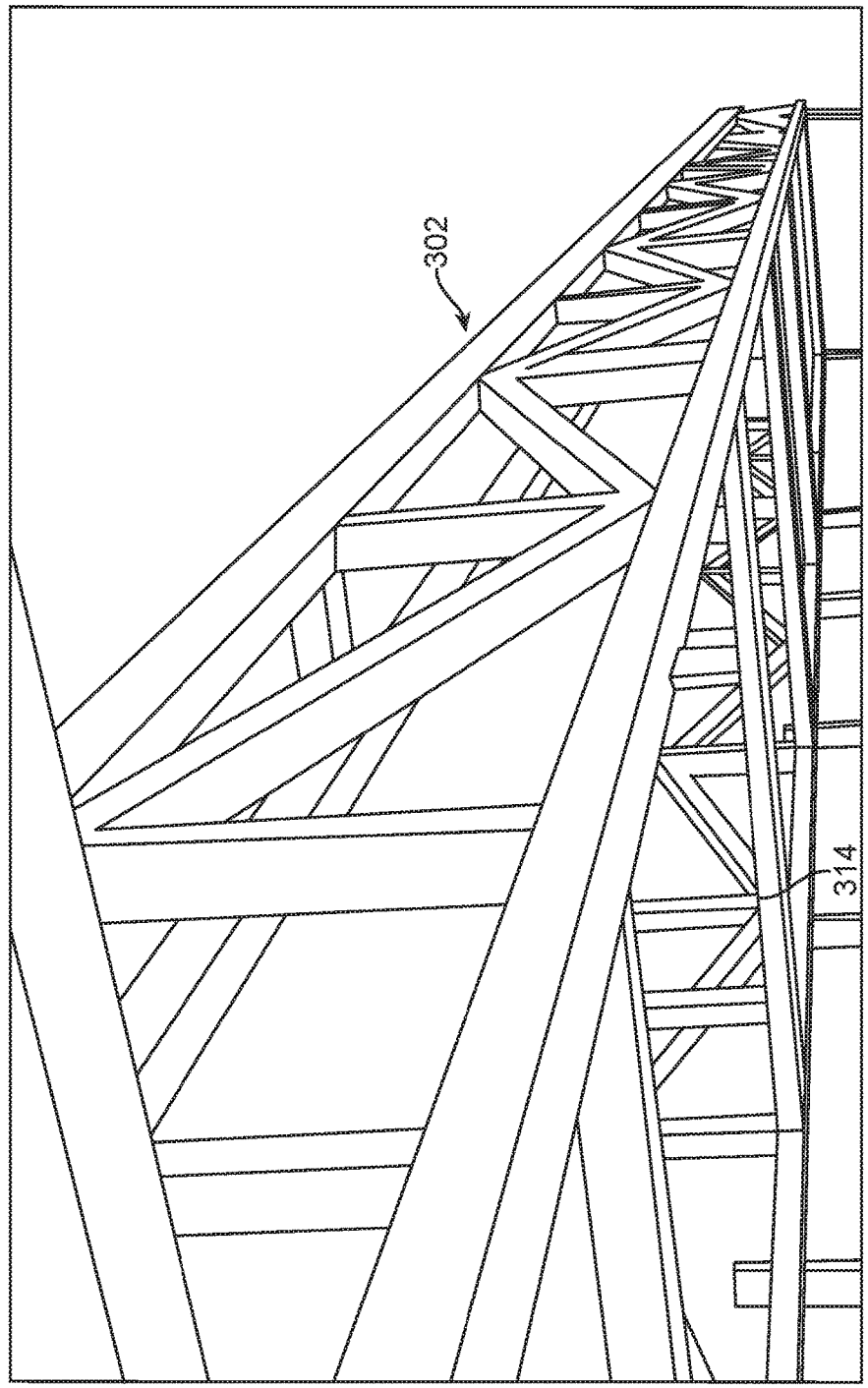

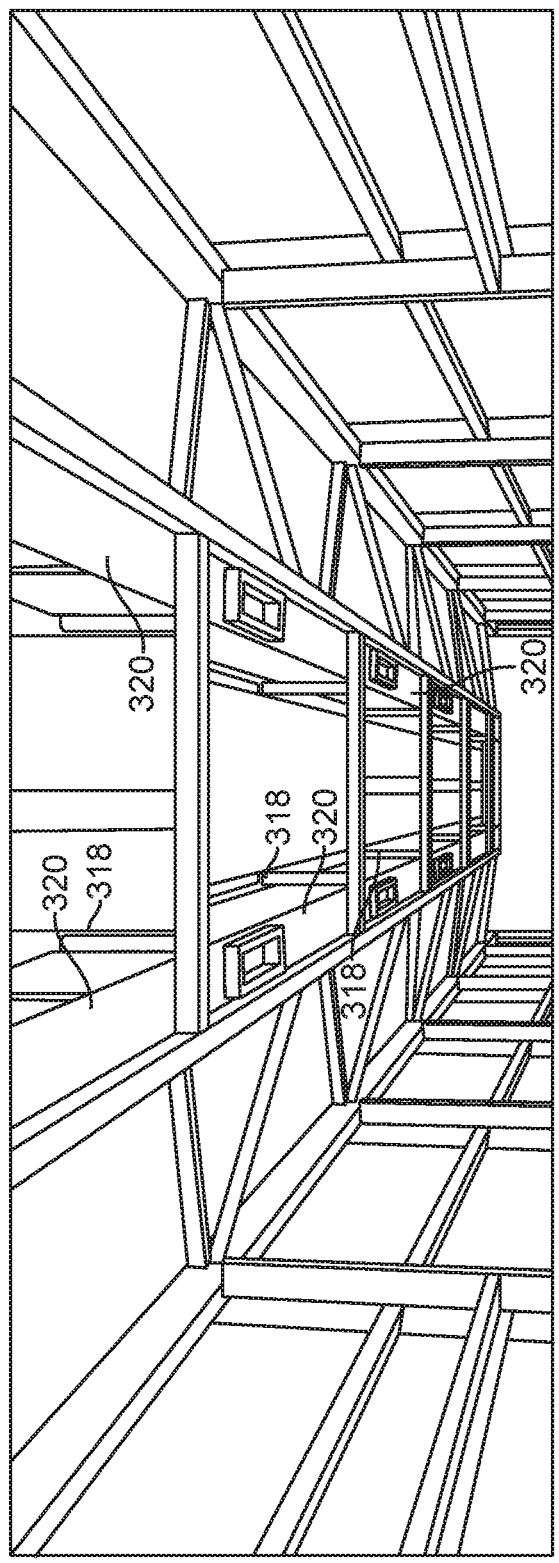

SIGHTSEEING TOURING VEHICLE WITH THEATER

CROSS-REFERENCE TO RELATED APPLICATIONS

This Application claims the benefit of priority of co-pending U.S. Utility Provisional Patent Application 62/214,637, filed Sep. 4, 2015, the entire disclosure of which is expressly incorporated by reference in its entirety herein.

All documents mentioned in this specification are herein incorporated by reference to the same extent as if each individual document was specifically and individually indicated to be incorporated by reference.

It should be noted that throughout the disclosure, where a definition or use of a term in any incorporated document(s) is inconsistent or contrary to the definition of that term provided herein, the definition of that term provided herein applies and the definition of that term in the incorporated document(s) does not apply.

BACKGROUND OF THE INVENTION

Field of the Invention

One or more embodiments of the present invention are related to a sightseeing inner city touring vehicle and more particularly, to a sightseeing inner city tour vehicle with a theater.

Description of Related Art

Conventional tour buses are well known and have been in use for a number of years. Regrettably, conventional tour buses are commuter buses with added creature comforts for long journeys. Some have modified interior configurations in terms of seating and use of entertainment stations and so on for a more comfortable and entertaining ride along a long journey, but the actual bus design is not for sightseeing. In general, touring buses are used to transport passengers over a long distance from one city or state to another city or state. The entertainment system provided by these touring buses is for entertainment of passengers over long distances, similar to viewing a video over long distance flight in an aircraft.

Accordingly, in light of the current state of the art and the drawbacks to current touring buses mentioned above, a need exists for a sightseeing touring vehicle with theater that would provide an open space interior architecture to allow sightseeing touring patrons optimal views of surrounding sights, including a view of a video display while maintaining all the creature comforts of a conventional vehicle.

BRIEF SUMMARY OF THE INVENTION

One or more embodiments of the present invention provide a sightseeing-touring vehicle with theater that has open plan architecture with wide openings (windows) that surround the sightseeing-touring occupants. The open-space architecture provides optimal views of surrounding sights, including a view of a large video display while maintaining all the creature comforts of a conventional vehicle for patrons inside.

These and other features and aspects of the invention will be apparent to those skilled in the art from the following detailed description of preferred non-limiting exemplary embodiments, taken together with the drawings and the claims that follow.

BRIEF DESCRIPTION OF THE DRAWINGS

It is to be understood that the drawings are to be used for the purposes of exemplary illustration only and not as a definition of the limits of the invention. Throughout the disclosure, the word "exemplary" may be used to mean "serving as an example, instance, or illustration," but the absence of the term "exemplary" does not denote a limiting embodiment. Any embodiment described as "exemplary" is not necessarily to be construed as preferred or advantageous over other embodiments. In the drawings, like reference character(s) present corresponding part(s) throughout.

FIGS. 1A to 1G are non-limiting, exemplary illustrations of various views of a sightseeing-touring vehicle in accordance with one or more embodiments of the present invention;

DETAILED DESCRIPTION OF THE INVENTION

Figure 1A:
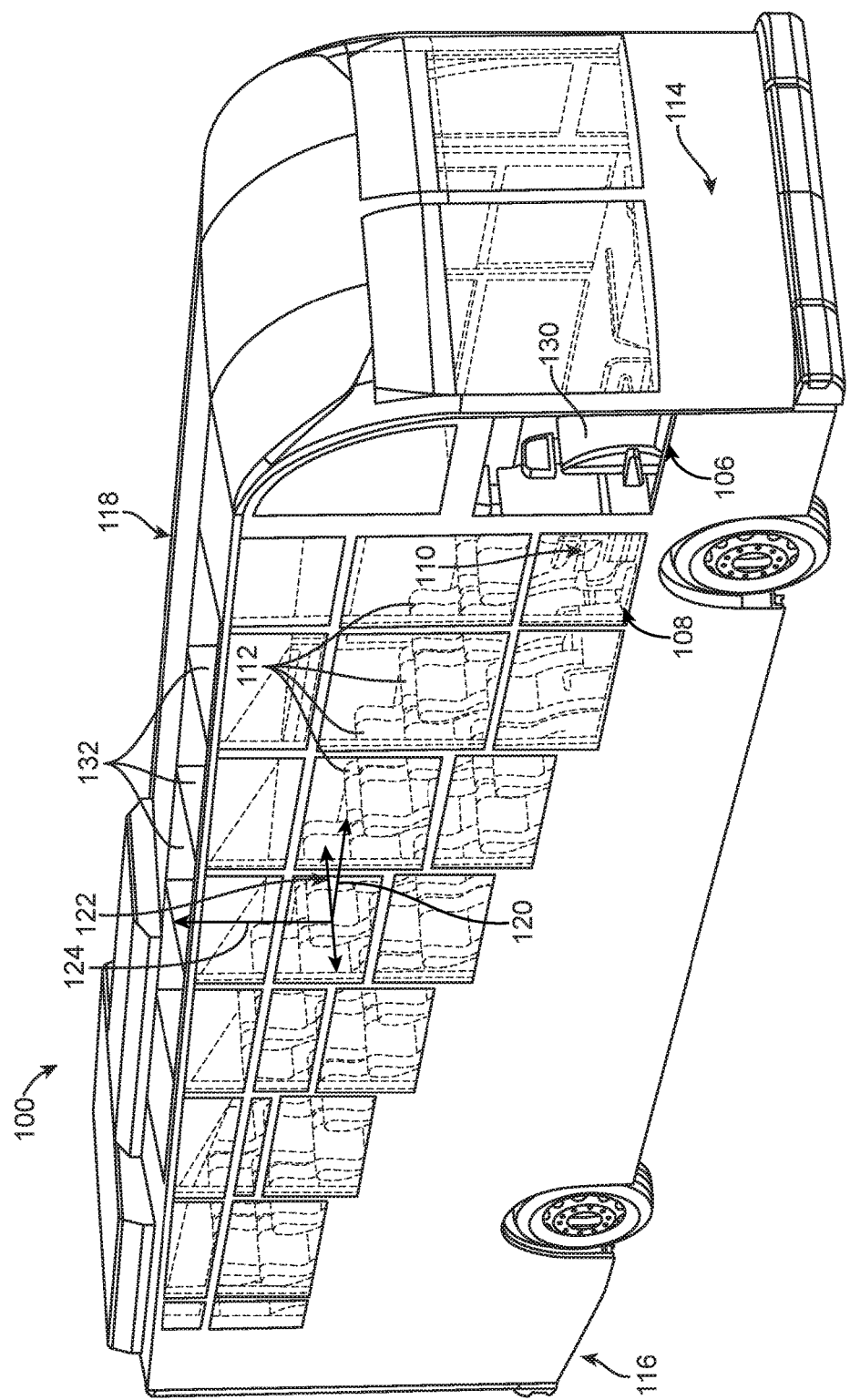
Figure 1B:
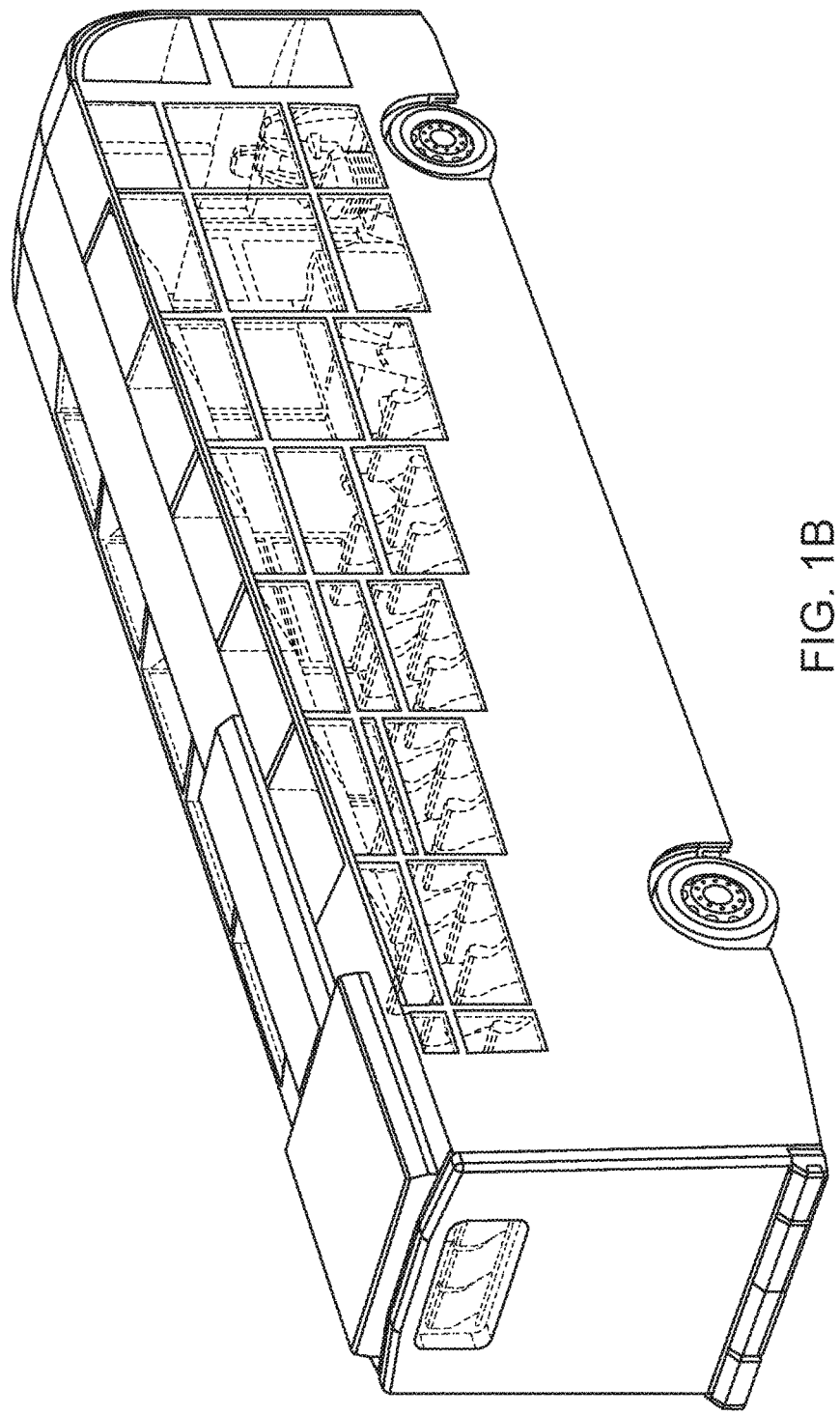
Figure 1D:
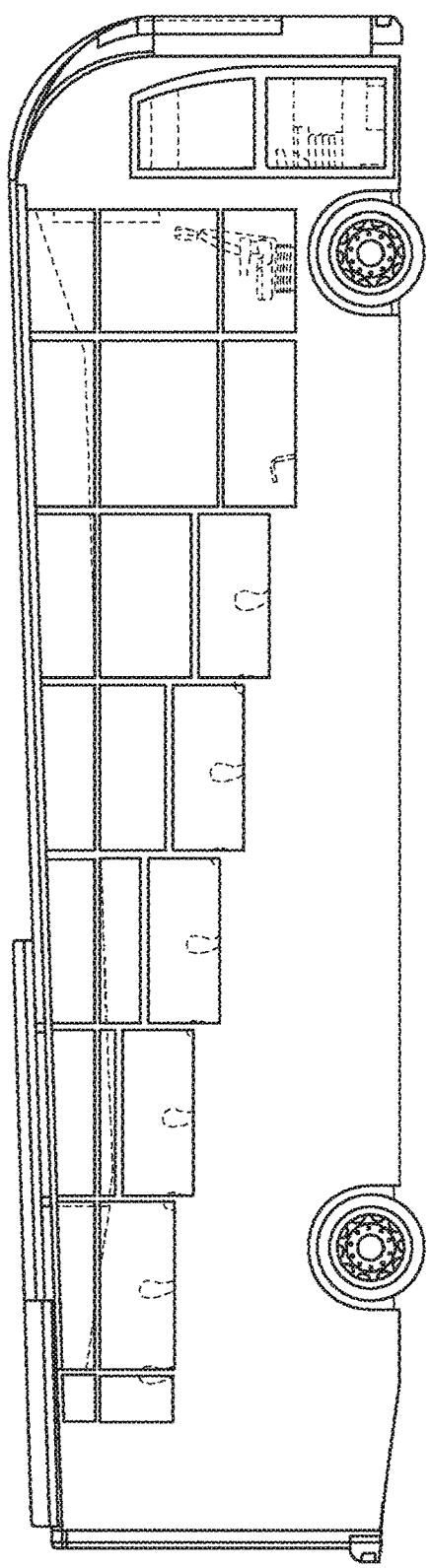

The detailed description set forth below in connection with the appended drawings is intended as a description of presently preferred embodiments of the invention and is not intended to represent the only forms in which the present invention may be constructed and or utilized.

It is to be appreciated that certain features of the invention, which are, for clarity, described in the context of separate embodiments, may also be provided in combination in a single embodiment. Conversely, various features of the invention that are, for brevity, described in the context of a single embodiment may also be provided separately or in any suitable sub-combination or as suitable in any other described embodiment of the invention. Stated otherwise, although the invention is described below in terms of various exemplary embodiments and implementations, it should be understood that the various features and aspects described in one or more of the individual embodiments are not limited in their applicability to the particular embodiment with which they are described, but instead can be applied, alone or in various combinations, to one or more of the other embodiments of the invention.

FIGS. 1A to 1G are non-limiting, exemplary illustrations of various views of a sightseeing-touring vehicle in accordance with one or more embodiments of the present invention. As illustrated in FIGS. 1A to 1G, one or more embodiments of the present invention provide a sightseeing-touring vehicle 100 with theater that has open-space or open plan architecture with wide openings (windows) that surround the sightseeing-touring occupants. The open-space architecture provides optimal views of surrounding sights, including a view of a large video display 102 while maintaining all the creature comforts of a conventional vehicle for patrons inside.

In general, sightseeing touring vehicle 100 in accordance with one or more embodiments of the present invention may for example be used for inner city travel to points of interest or for example, movie locations where movies were filmed, enabling sightseers to have an expanse view of the physical location of the points of interest such as filmed sight while inside vehicle 100 and watching selected clips of all the movies filmed or other points of interest from that exact location on the large video monitor 102. This way, sightseeing touring patrons can personally experience and actually physically be in the same exact location while simultaneously viewing the selected clips of points of interests or movies that were filmed at that location for a better perspective of the filmed movie. In other words, sightseeing-touring vehicle 100 enables occupants to imagine what it would have been like when for example, the movie was filmed at that location. Sightseeing-touring vehicle 100 in accordance with one or more embodiments of the present invention may further be used for touring non-related movie points of interest and general sightseeing touring applications.

As illustrated in FIGS. 1A to 1G, driver compartment 106 of vehicle 100 is at the front end 114 of vehicle 100, and includes a driver seat 130 and cockpit for proper and safe operation of sightseeing touring vehicle 100, meeting all jurisdictional safety requirements. Further included is a tour-guide section 108 behind driver compartment 106 to provide an interactive sightseeing tour for the sightseeing patrons of sightseeing touring vehicle 100. Tour-guide section 108 includes a tour-guide seat 110 that is positioned back-to-back behind driver compartment 106, with tour-guide seat 110 and the tour-guide facing the sightseeing occupants of sightseeing-touring vehicle 100.

In general, tour-guide section 108 includes a set of control instrument (not shown) that control the entertainment system (e.g., a large flat panel high bright display 102, including audio/speakers). Display 102 may be controlled by a programmable system that allows the tour guide to select any desired clip from any movie and play the selected clip on display 102. In general, the content of the clips selected may be generally related to the physical location where that portion of the clip was filmed. Display screen 102 is provided just behind the driver's compartment 106 and facing the patrons section. It should be noted that the content of the media need not be related to filmed movies but may be related to some point of interest such as a section of downtown London.

As further illustrated in FIGS. 1A to 1G, one or more embodiments of sightseeing touring vehicle 100 is configured to provide theater-type seats 112 tiered upward in rows from the front 114 toward rear 116 of sightseeing touring vehicle 100, with seats 112 facing towards display 102 and front 114 of vehicle 100. Elevated tiered arrangements for seats, windows, flooring, etc. is disclosed in U.S. Pat. No. 4,964,671 to Millar, the entire disclosure of which is expressly incorporated by reference herein in its entirety.

The elevated tiered arrangements in accordance with one or more embodiments of the present invention is configured to allow each occupant to have a forward clear line of sight 120 of the entire display screen 102, lateral clear line of sights 122 of outside the vehicle, and upward clear line of sight 124 through glass portion of roof 118 of vehicle 100. Accordingly, all occupants have unobstructed views of outside surroundings, including laterally, through roof 118 (which is glass 132 right above each occupant seat 112), and front views.

It should be noted that forward line of sight 120 is to a focal point positioned at a front 114 of the enclosed cabin (e.g., display 102). The focal point in accordance with one or more embodiments of the present invention is at an elevation that is higher than the elevation of the final, back row of the row of seats 112. As indicated above, at least one seat (tour-guide seat 110) is oriented to face the rows of seats 112, with the at least one seat 110 having an elevation that is generally almost equal to that of the final, back row of the rows of seats 112 to enable the back row occupants to actually see the tour-guide in front 114.

As further illustrated in FIGS. 1A to 1G, roof 118 is comprised of three longitudinally extending sections 134, 136, and 138, with two lateral sections 134 and 138 comprised of windows (above seated occupants) 132 and a middle section 136 that includes roof support structure (detailed below). The open (windowed) lateral sections 134 and 138 of roof 118 enables occupants to have unobstructed overhead views. This is especially important if a filming location sight to be visited requires views that may be overhead such as views of high-rise building or an overhead bridge. A width 140 of the middle section 136 is also made as short as possible in order to maximize a width 142 of lateral section 134 and 136 windows 132 for maximum viewing. Middle section 136 includes the components that provide creature comforts for the occupants such as the AC plenum and further, the electrical wiring and others for the overall proper operation of the vehicle and the entertainment system.

A deck-floor 144 of the enclosed cabin has a general slope that rises from front 114 and peaks at back 116 of the vehicle cabin. The enclosed cabin is comprised of multiple decks 144 of varying elevations (and sizes), with each deck 144 adjoined by an incline plane to form steps. At least two rows of seats 112 may be positioned within on a deck 144 of the multiple decks. The rows of seats 112 may be separated by at least one aisle 152.

Figure 1E:
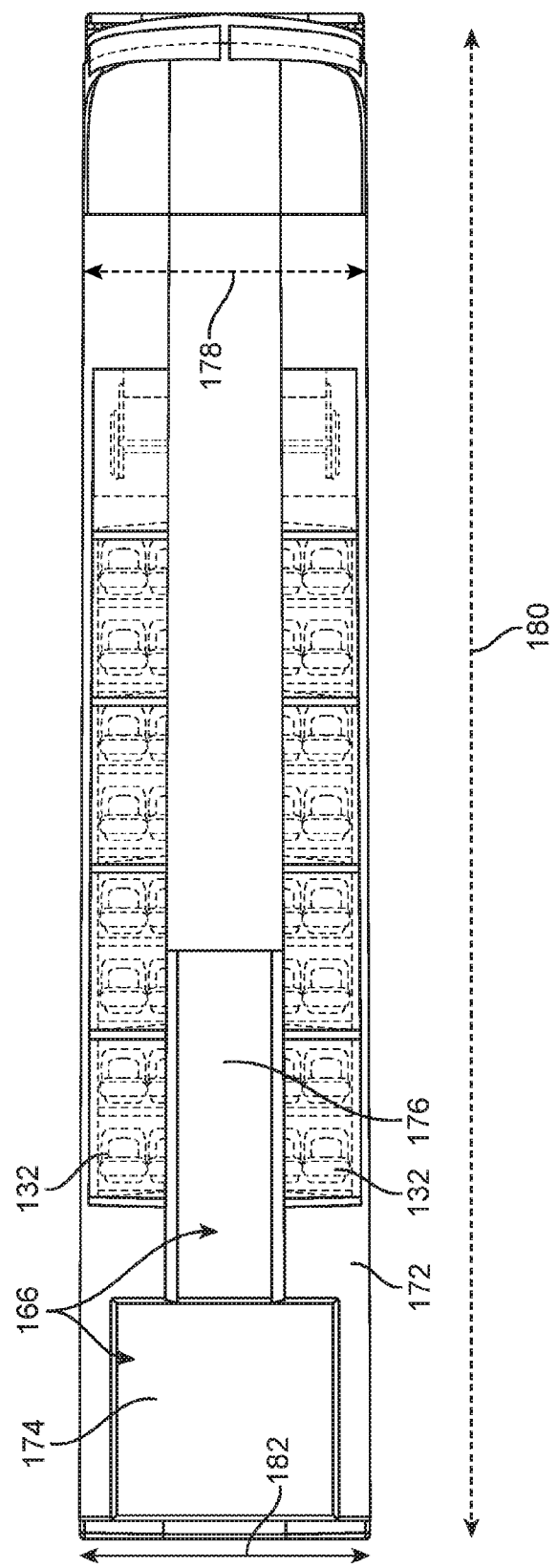
Figure 1F:
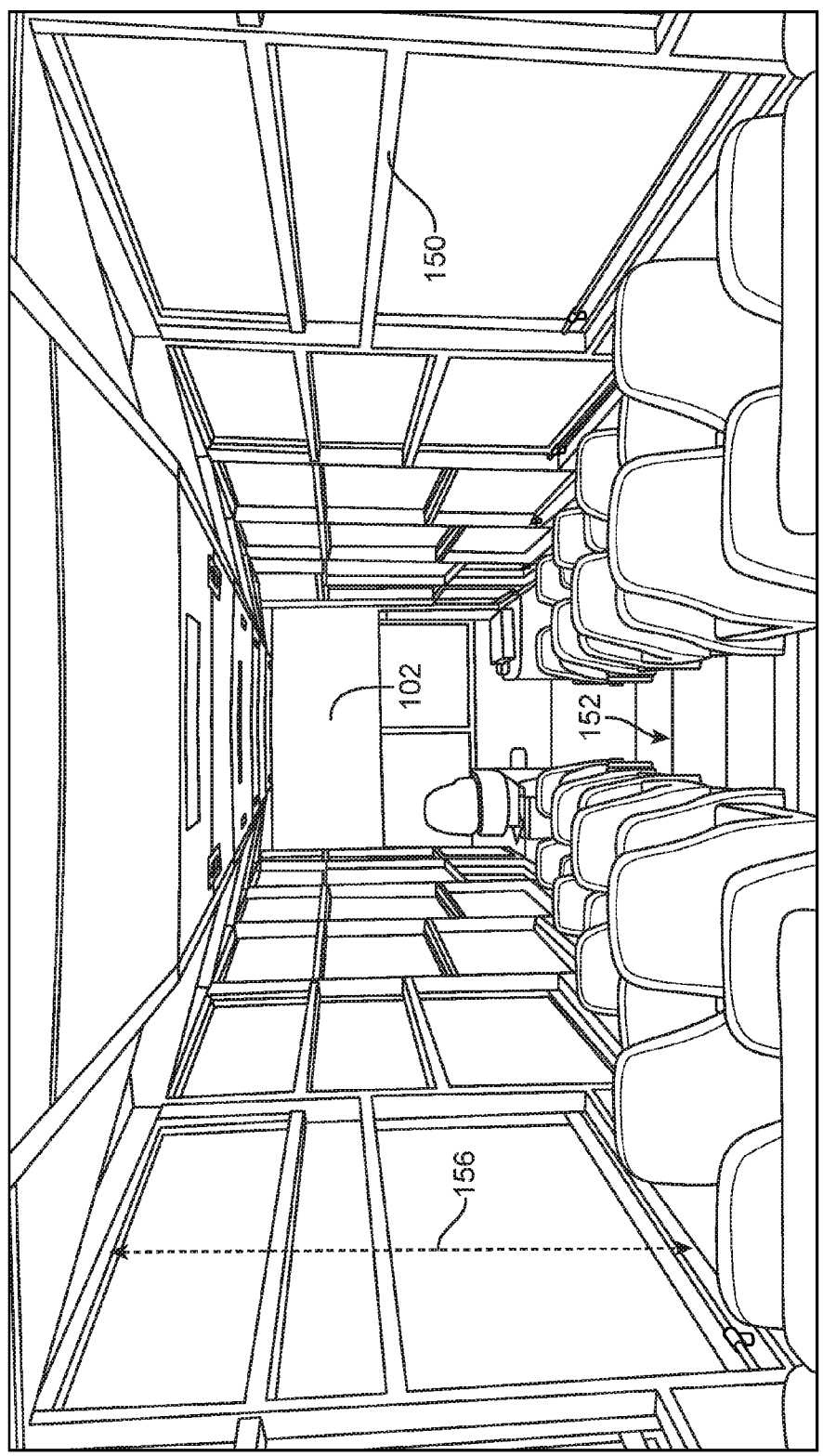
Figure 1G:
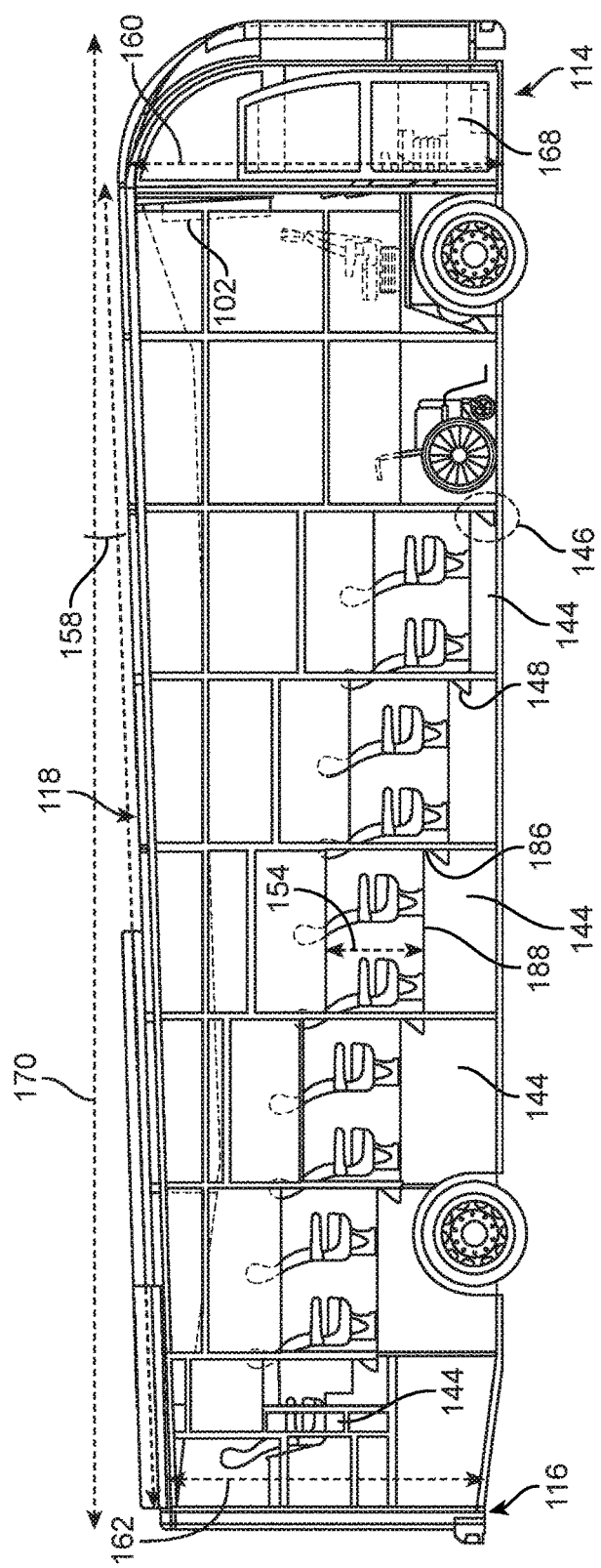

FIG. 1G is non-limiting, exemplary illustrations of the sightseeing-touring vehicle shown in FIGS. 1A to 1F, but with a sidewall removed. As illustrated in FIGS. 1A to 1G and further detailed below, each deck 144 is comprised of a forward leaning slanted rise 148 to form stepped flooring. A front portion 146 of each deck 144 of an elevation or elevated flooring is tilted (slanted or sloped) to prevent potential falls while stepping up to the next higher elevated rows of seats 112. That is, the forward leaning slanted edge 186 of each deck 144 forms as a slanted step that prevents a foot of an individual from hitting the slated rise 148.

Lateral windows 150 slide-open (up/down) to enable complete emersion experience of sightseeing occupants with the filmed location, including the experience of the climate or outside elements experienced while the movie was filmed. As best illustrated in FIGS. 1F and 1G, more specifically, lateral windows 150 are designed to provide the largest possible view of the outside of vehicle 100 by starting at a first distance 154 (about 30 inches) from a floor 188 of deck 144 of vehicle 100 and up all the way to roof 118 and a second distance 156 (about 2 feet) of roof 118 of vehicle 100 on either side. Lateral windows 150 may be coated with architectural reflective coating to stop heat entering vehicle 100.

As further illustrated in FIGS. 1A to 1G, roof 118 of vehicle 100 is slanted at an angle 158, which provides a proper viewing angle for entertainment display 102. In other words, front 114 of vehicle 100 has a higher elevation or height 160 than back 116 of vehicle 100, with roof 118 tapering at angle 158 from a higher elevation of height 160 at front 114 to a lower elevation of height 162 at back 116 of vehicle 100.

The difference in front and rear heights 160 and 162 of vehicle 100 between is about 20 inches, which may vary dependent on the number of rows of seats 112, the length 164 of vehicle 100, the bulkiness of the AC modules 166, etc. In general, the height 162 at front 114 is less than 14 ft (the highest height allowed for safety) and is at about 13 ft 6 inches to allow for AC modules 166 (at rear 116) while preserving proper viewing of the front display 102 by rear-most seated occupants. In general, the interior front roofline is 20 inches higher than the back, which as indicated above, provides sufficient clearance for the large display 102 and enable individuals to board the bus from the front door 168 to comfortably pass under screen 102 without bending or hitting the display 102.

Vehicle 100 is illustrated as a two-axel system with a length 170 of about 45 ft accommodating 49 occupants, with tour guide and driver not counted. However, with use of wheel chair, 47 seats plus 2 wheel chairs are used (not counting tour guide and driver). It should be noted that a shorter two-axel vehicle may be modified (i.e., lengthened) in well known conventional manner to provide a 45 ft two-axel sightseeing touring vehicle. However, the modification in accordance with the present invention includes duplicating the original manufacturers construction of the chassis but with added material (structure) for improved structural integrity wherein the stretched vehicle has in fact, a stronger (double the strength) chassis then the original. The stretching of the chassis accommodates an extra deck of seating. It should be noted that modifications of two-axel vehicle would not be necessary if the vehicle came at 45 ft length to accommodate the final back deck of seats to accommodate the total of 47 occupants. However, the length of the vehicle need not be limited to 45 ft and may be dictated by the number of occupants. For example, a shorter, 30 ft vehicle may be used instead with no required modification of the vehicle with respect to its length, but with lesser number of occupants.

As further illustrated in FIGS. 1A to 1G, air conditioning (AC) system 166 is positioned on rooftop 172 of roof 118 of sightseeing-touring vehicle 100 and has been modified to provide the maximum viewing with least obstruction for rear end rooftop windows 132 (best illustrated in FIG. 1E). The present invention has modified two or more modules of the AC unit from the conventional parallel configuration to "T" configuration as illustrated. That is, the first module 174 was separated from other modules 176 and is oriented transversely along a width 178 of vehicle 100 as illustrated and second and any subsequent modules 176 are oriented longitudinally along length 170 of vehicle 100.

The second and any subsequently module 176 is longitudinally oriented (in relation to longitudinal axis 180 of vehicle 100) and positioned in between two lateral rear roof windows 132 (at the middle section 136) so that they do not cover over and obstruct views from those rear set of windows 132. Internal refrigerant fluid lines and other components were modified to accommodate the new T configuration. That is, the AC unit 166 was physically separated into the modules 174 and 176 and arranged and installed as the illustrated "T" configuration with the internal components also rearranged to provide a single working AC unit. In other words, the AC unit is conventional and is generally manufactured with multiple parallel, adjacently positioned modules 174, 176 that if not modified would be positioned on rooftop 172 of vehicle 100 transversely as indicated by first module (the back most module) 174, forming a unit comprised of multiple parallel positioned, transversely oriented (in relation to the transverse axis 182 of vehicle 100) modules. The modules 174, 176 came as a single generally rectangular configuration, which if used without modification in accordance with the present invention, would have covered the back most rooftop window 132. Conventional installation would have obstructed the views for occupants seated at the back of vehicle 100.

Figure 2A:
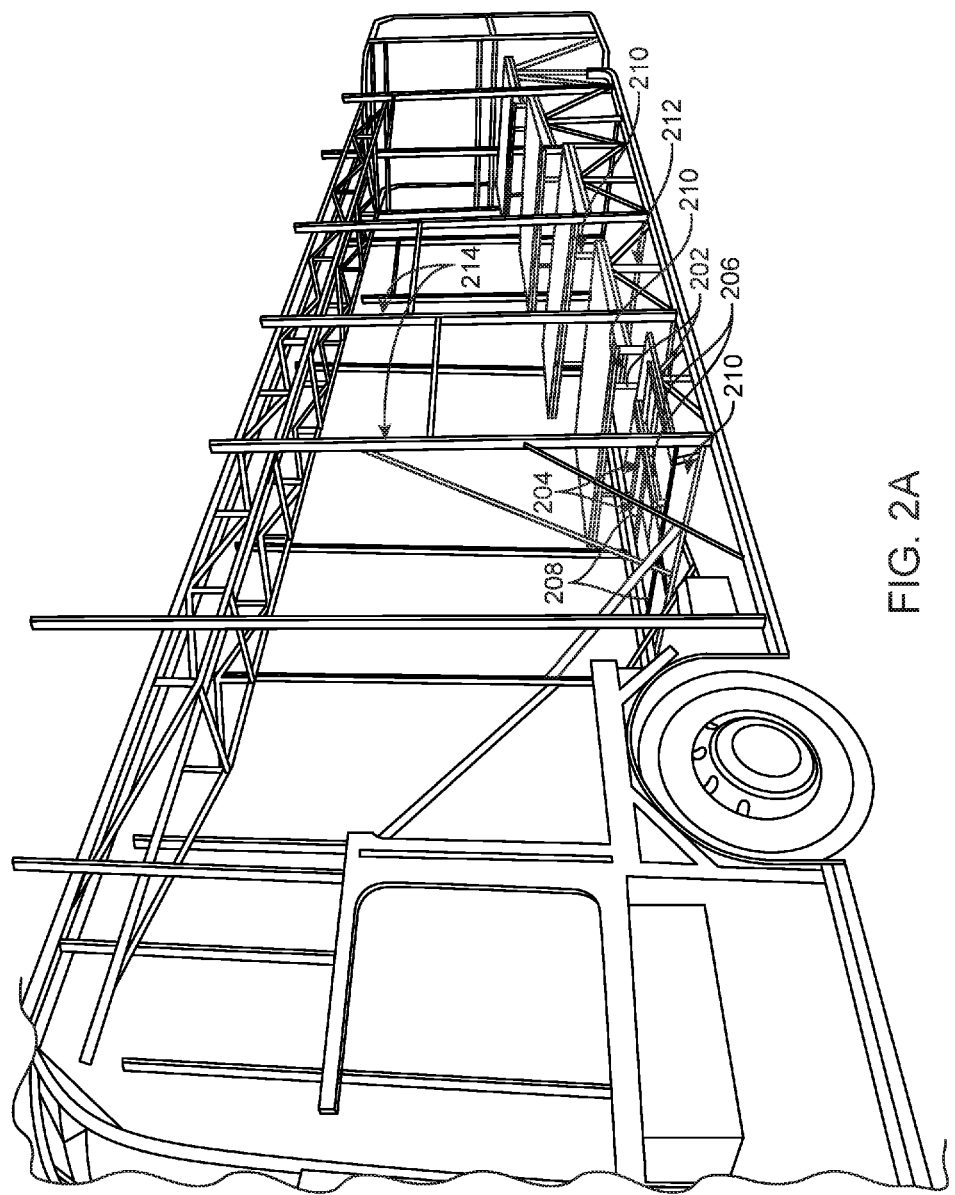
FIGS. 2A to 2U are non-limiting, exemplary illustration of seating deck support frame structure in accordance with an embodiment of the present invention.
Figure 2B:
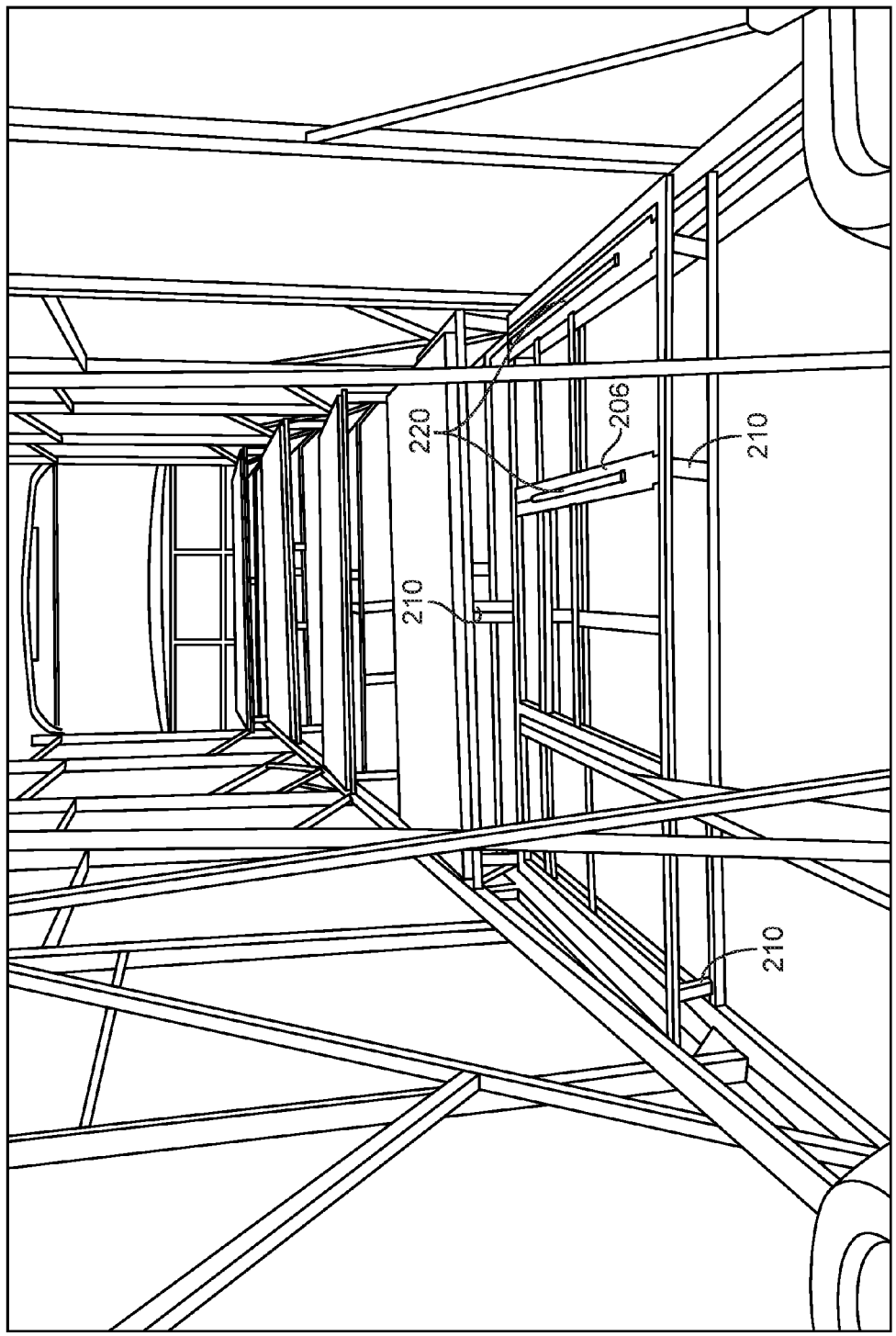
Figure 2D:
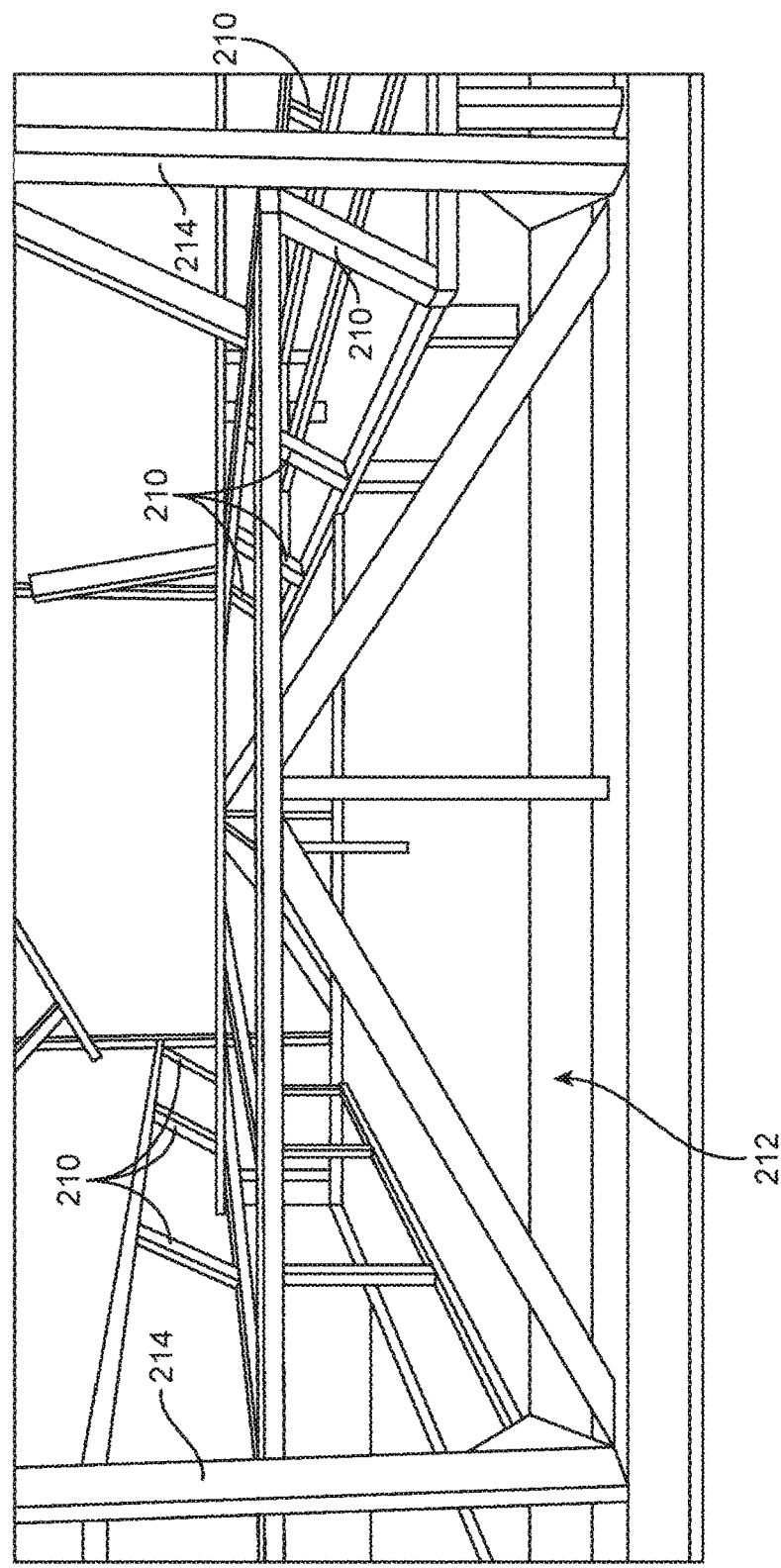
Figure 2E:
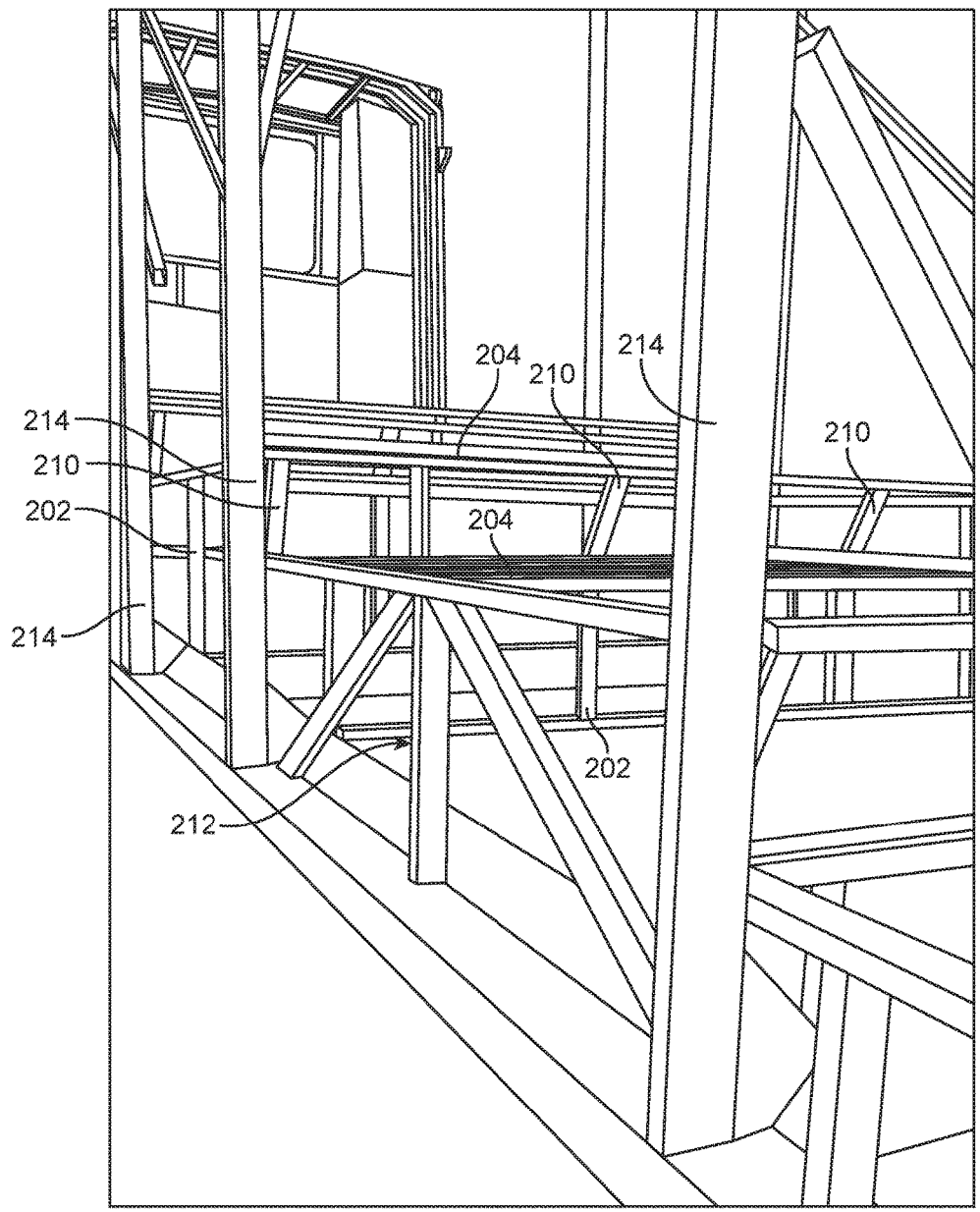
Figure 2F:
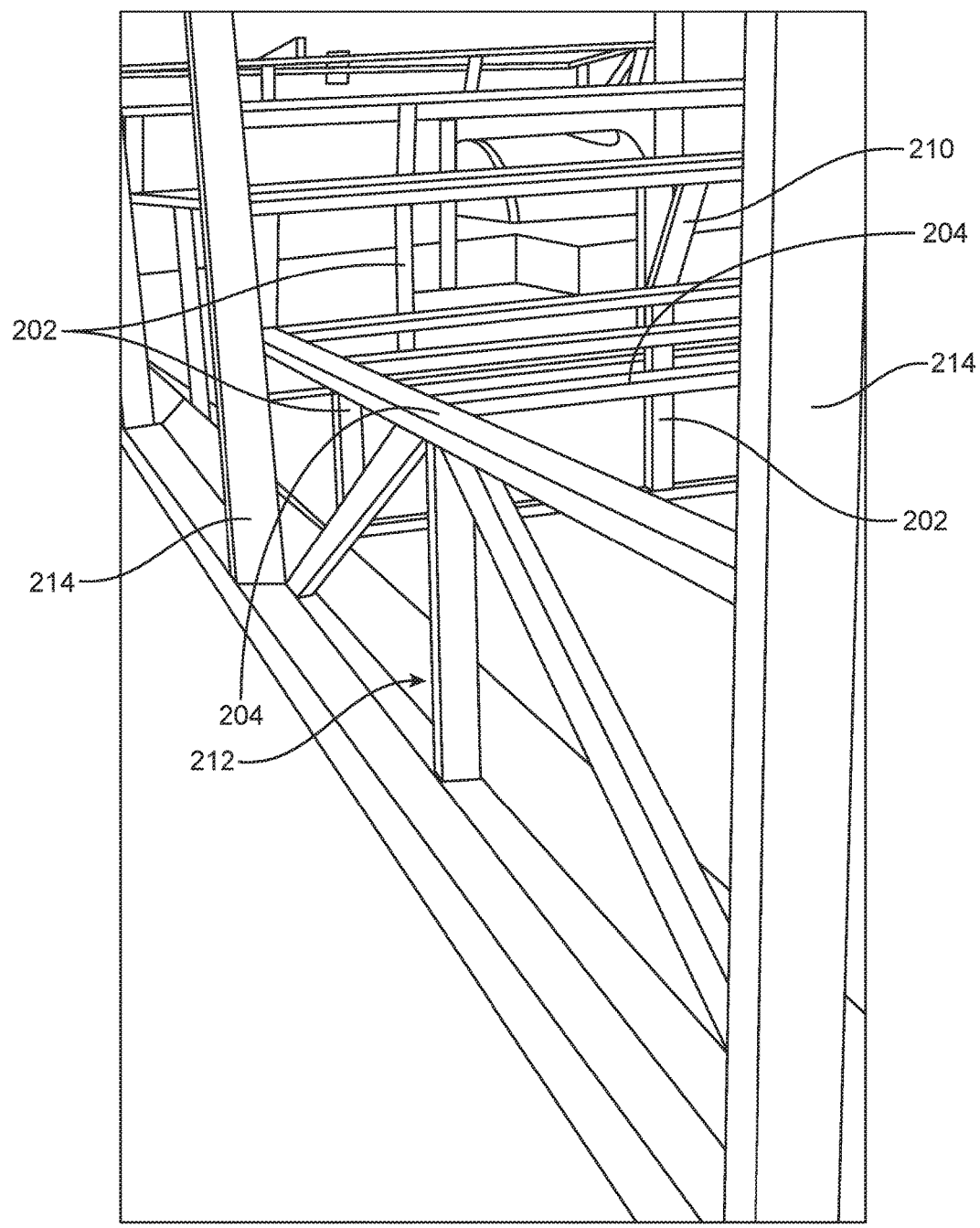
Figure 2G:
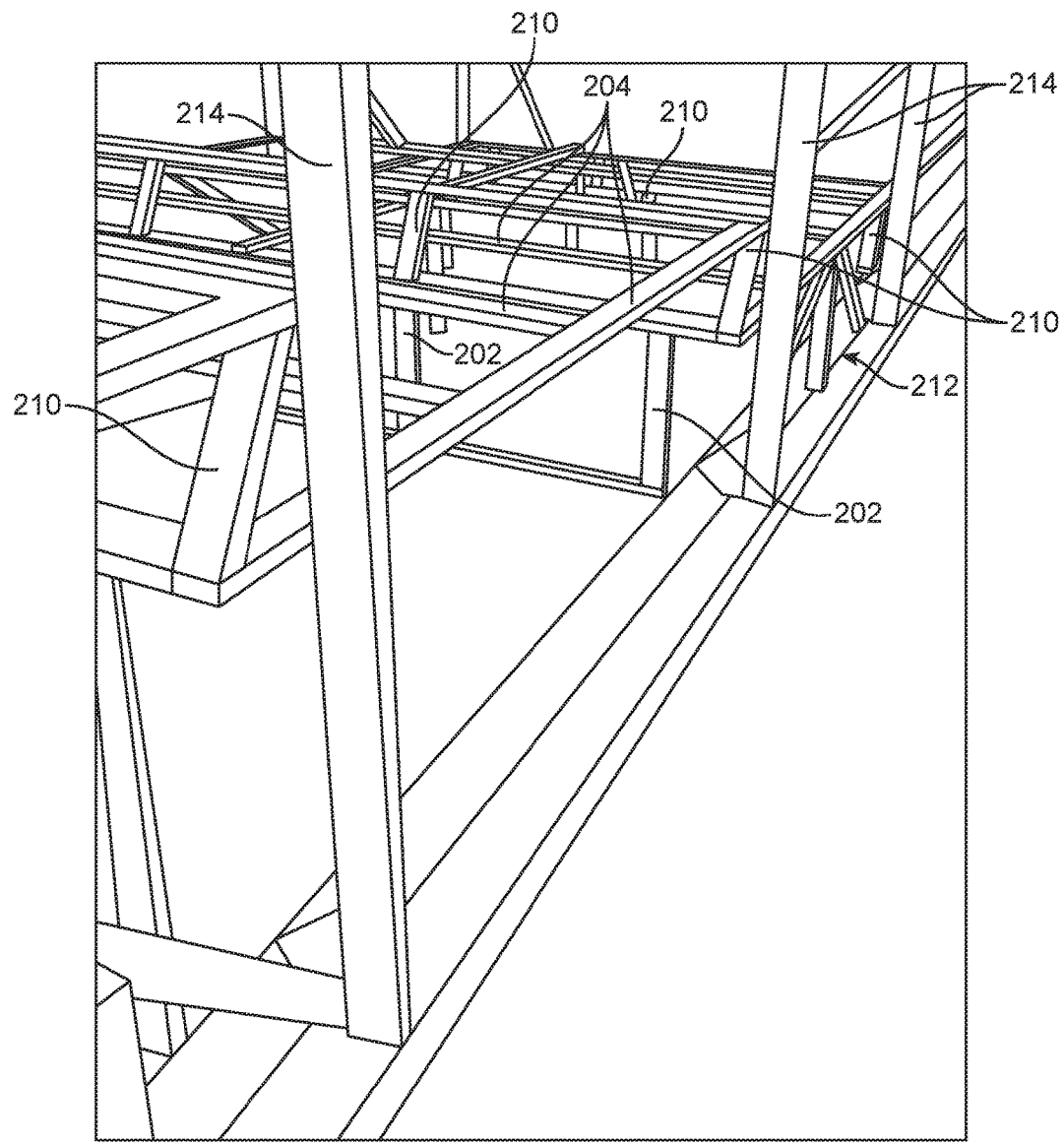
Figure 2I:
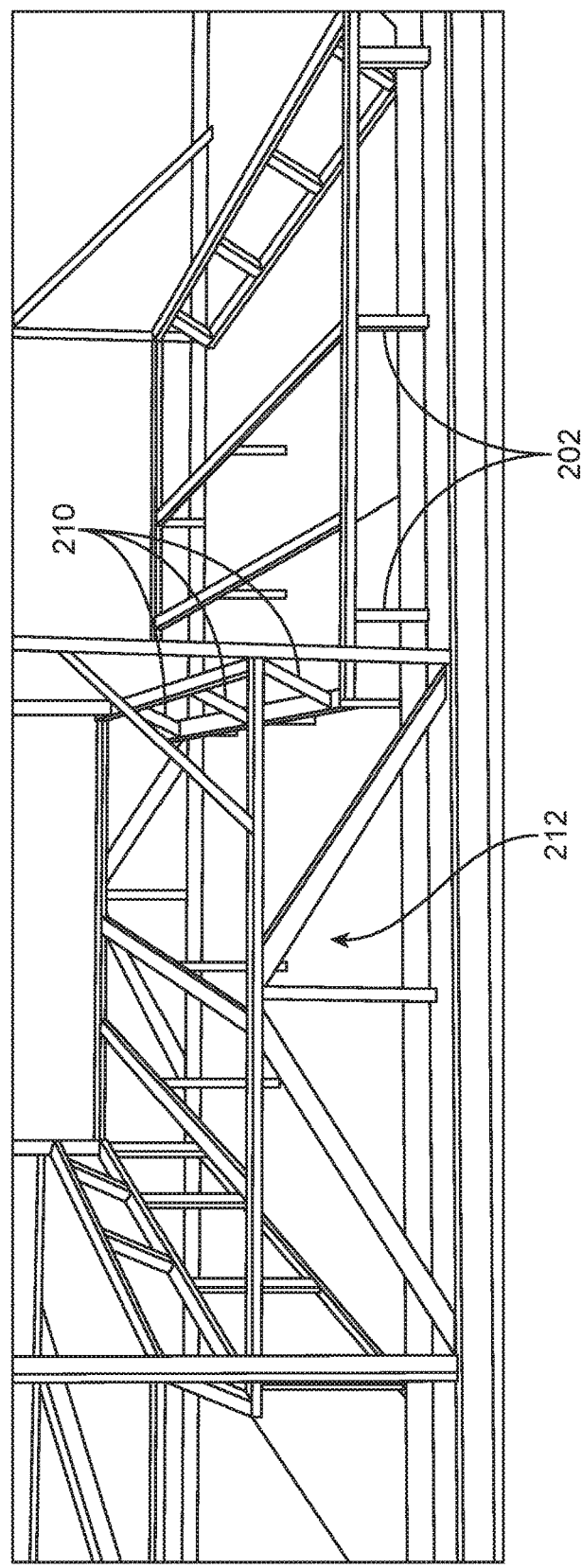
Figure 2J:
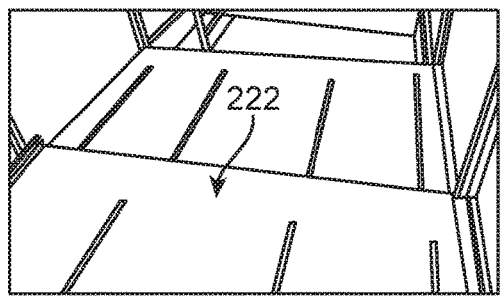
Figure 2K:
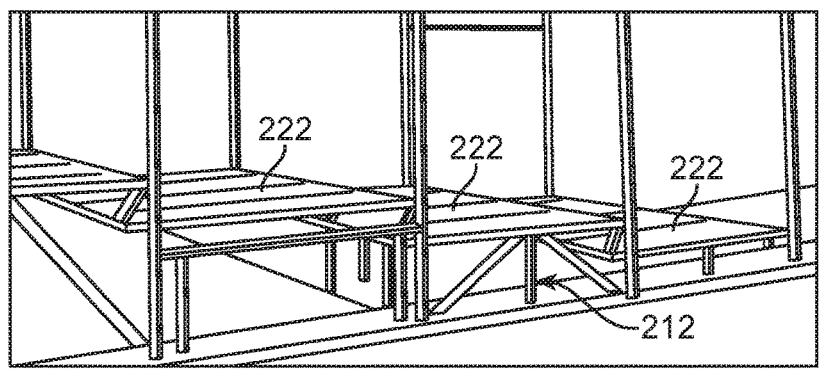
Figure 2L:
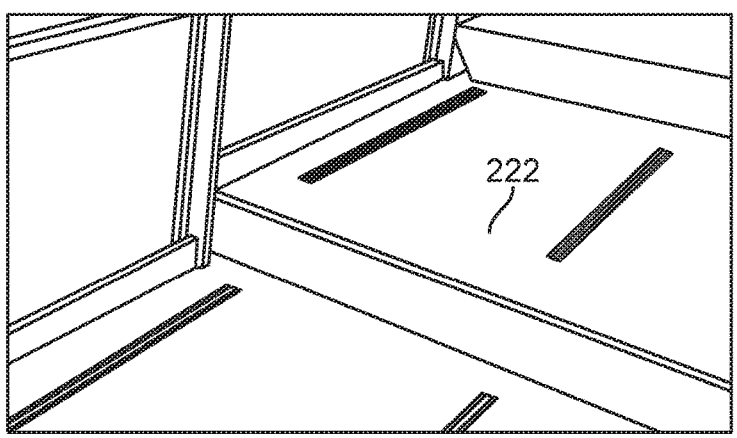
Figure 2M:
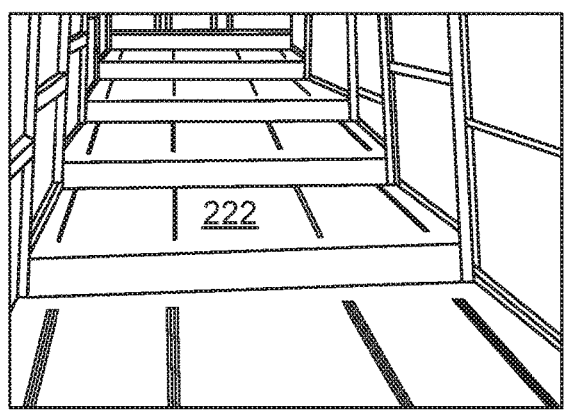
Figure 2N:
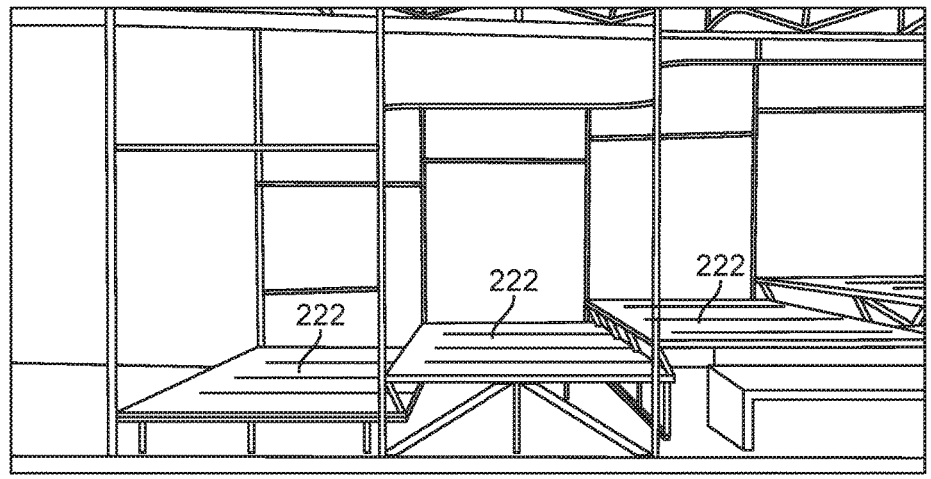
Figure 2O:
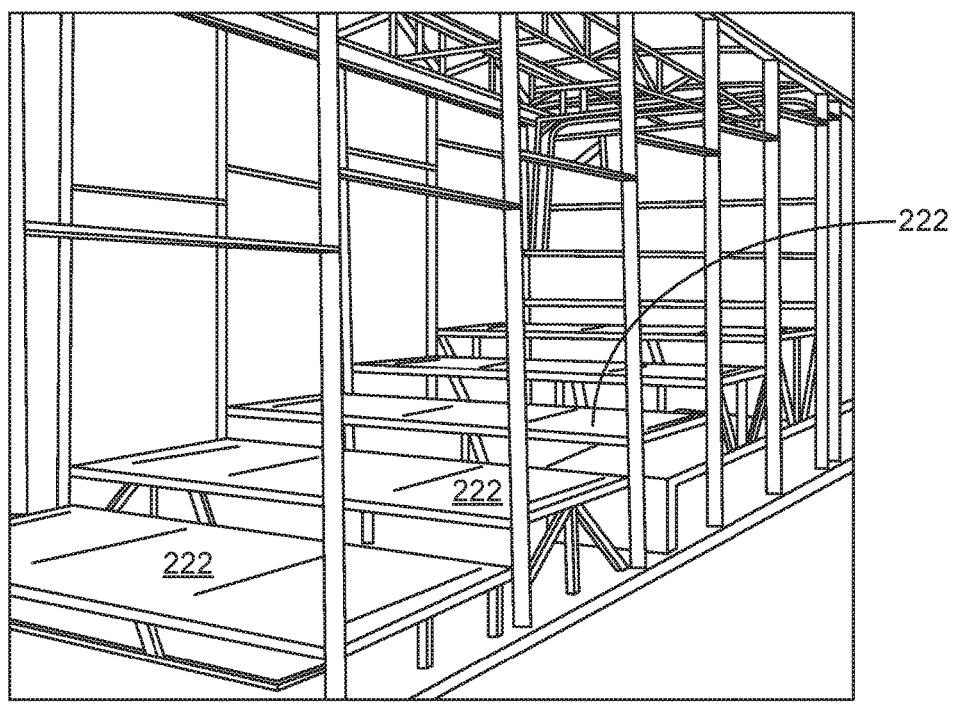
Figure 2P:
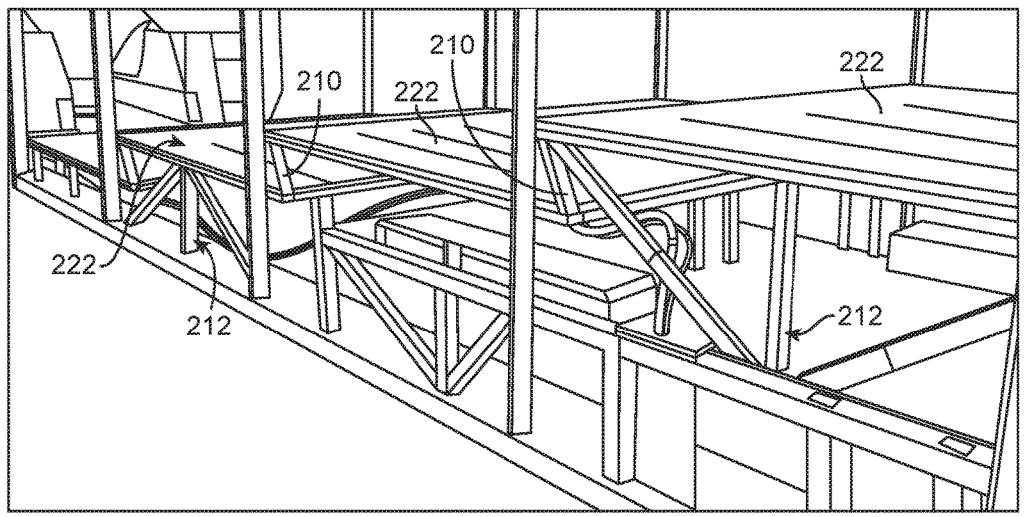
Figure 2Q:
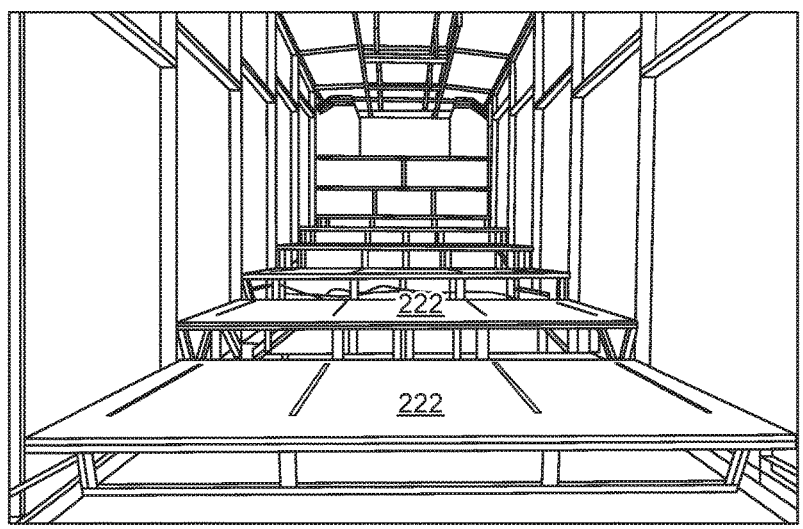
Figure 2R:
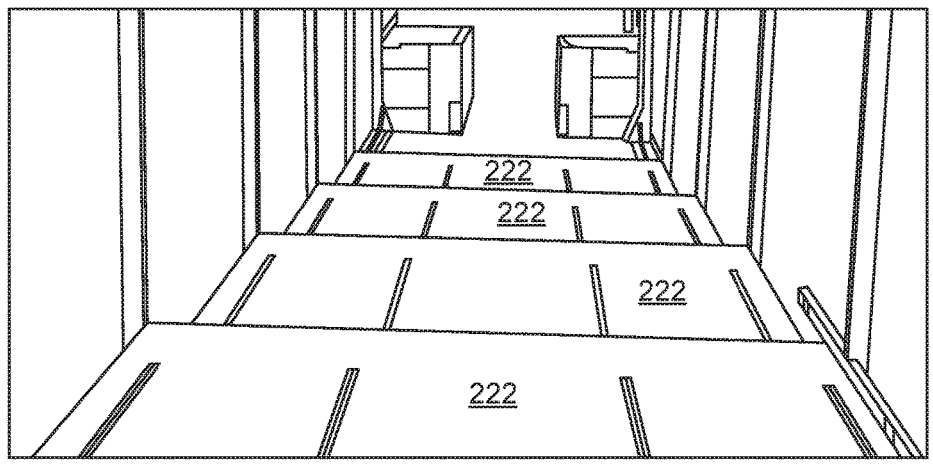
Figure 2S:
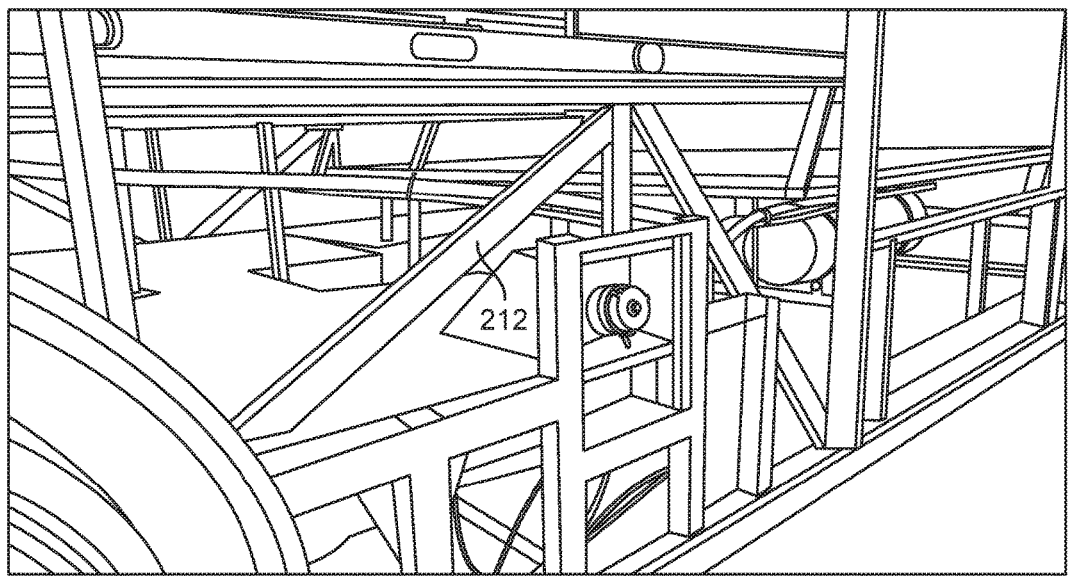
Figure 2T:
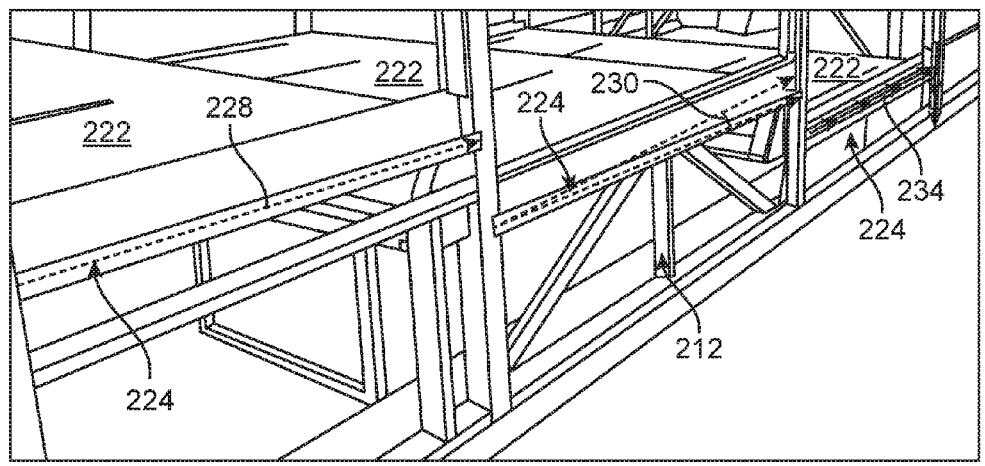
Figure 2U:
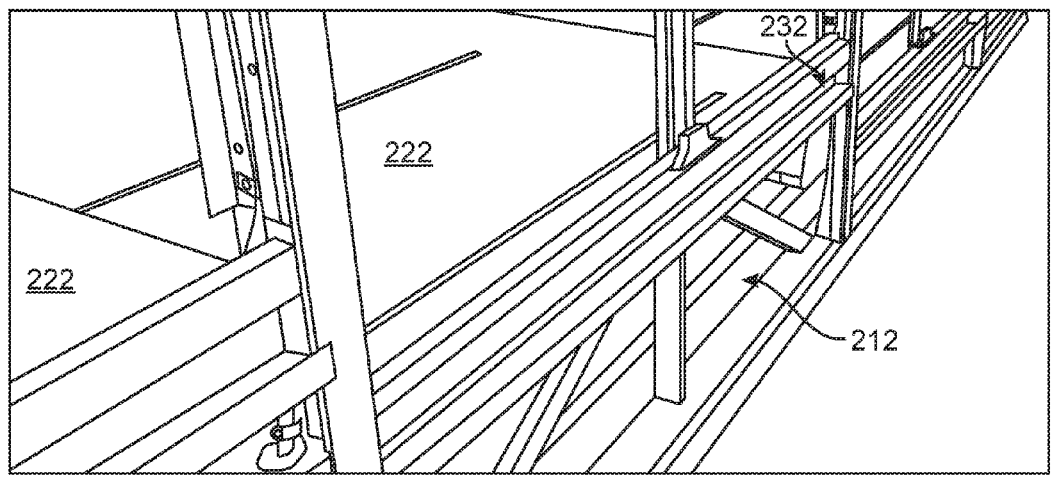

FIGS. 2A to 2U are non-limiting, exemplary illustration of seating deck support frame structure in accordance with an embodiment of the present invention. As indicated above, interior floor 188 is tiered upward in a series of steps from front 114 of vehicle 100 toward rear 116 of vehicle 100, forming a series of progressively elevated decks 144. This progressive elevation of deck 144 from front 114 of vehicle 100 to back 116 is accomplished by a tiered seating deck support frame structure illustrated in FIGS. 2A to 2U. As illustrated, each deck 144 is comprised of a set of generally vertically oriented posts 202 on top of which are mounted a set of generally horizontal crossbars 204. Varying a height of the set of generally vertically oriented bars 202 per deck 144 varies the elevation of a particular deck 144.

More specifically, each deck 144 is comprised of both longitudinally and transversely extending horizontal bars 206 and 208 that generally parallel longitudinal and traverse axis 180 and 182 of vehicle 100. Generally vertically oriented posts 206 support both longitudinally and transversally extending horizontal bars 206 and 208. It should be noted that the horizontal set of crossbars 206 and 208 need not have longitudinal/transverse (or orthogonal) relationship, but may be oriented at an angle (e.g., diagonally) in relationship to one another. It should further be noted that the number of bars (generally vertical or generally horizontal) 202, 204 may be varied per deck 144. Further, the front row vertical posts 210 of each deck 144 is preferably slanted at an angle rather than being vertical. As best illustrated in FIG. 1G, this arrangement enables of slanted or angled front row vertical posts 210 per deck 144 enables the front portion 146 of each deck 144 of an elevation or elevated flooring to be tilted to prevent potential falls while stepping up to the next higher elevated rows of seats 112.

The lateral frames 212 of each deck 144 may also comprise of truss structure connected to lateral vertical vehicle frame posts 214 of vehicle 100. The lateral truss structures 212 are connected to the lateral vertical vehicle frame posts 214 of vehicle 100 as well as horizontal bars 204 of decks 144 to provide added support to lateral vertical vehicle frame posts 214 of vehicle 100 to improve the structural integrity of the overall vehicle frame. In other words, lateral truss structure 212 forms a double-duty piece by providing tiered (elevated) flooring and supports lateral vertical vehicle frame posts 214 of vehicle 100 that ultimately support roof 118.

As best illustrated in FIGS. 2B and 2C, after a deck frame structure is built, seat support tracks 220 are positioned on top of the longitudinally extending bars 206 of the deck frame and secured in conventional manner (e.g., by welding etc.). The seat support tracks 220 enable securing of seats 112 at a desired track position along front-back of the deck 144.

As best illustrated in FIGS. 2J to 2U, after deck frame structure is built (including securing the seat support tracks 220), flooring (e.g., plywood) 222 is positioned and secured on top of the deck frame structure. Flooring 222 has cuts to expose and enable access to seat support tracks 220 for installation of the seats.

Thereafter, as best illustrated in FIGS. 2T and 2U, lateral drainage channels (pans) 224 are added to sides 226 of each deck 144, extending longitudinally 228 and angled 230 slightly in relation to floor 222 of deck 144 to drain off any water that may leak through a window structure (as shown by arrows 234). A lateral drainage channel 224 includes draining openings 232 to allow run-off of leaked water.

Figure 3A:
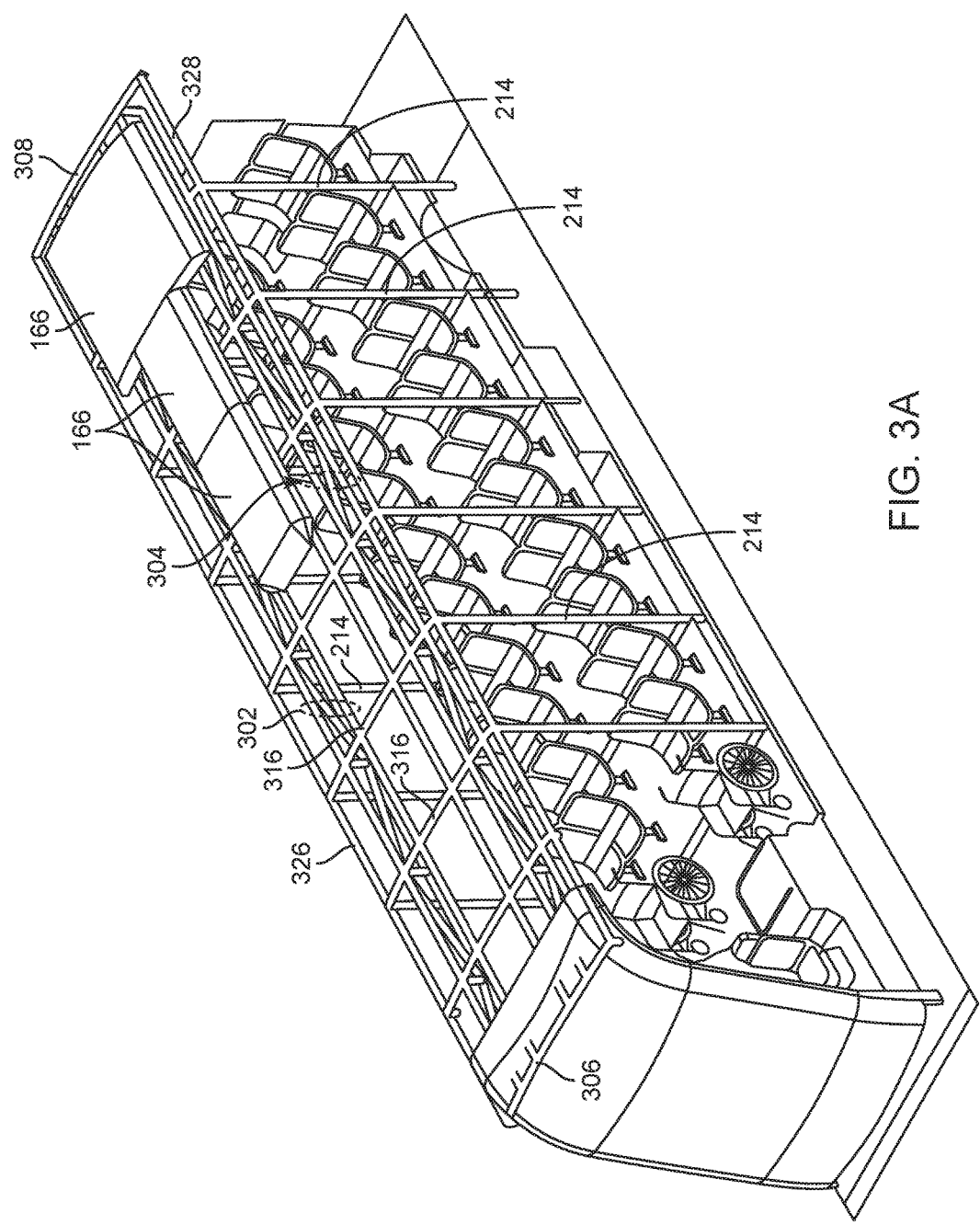
FIGS. 3A to 3T are non-limiting, exemplary illustrations of a roof support framework in accordance with one or more embodiments of the present invention.
Figure 3B:
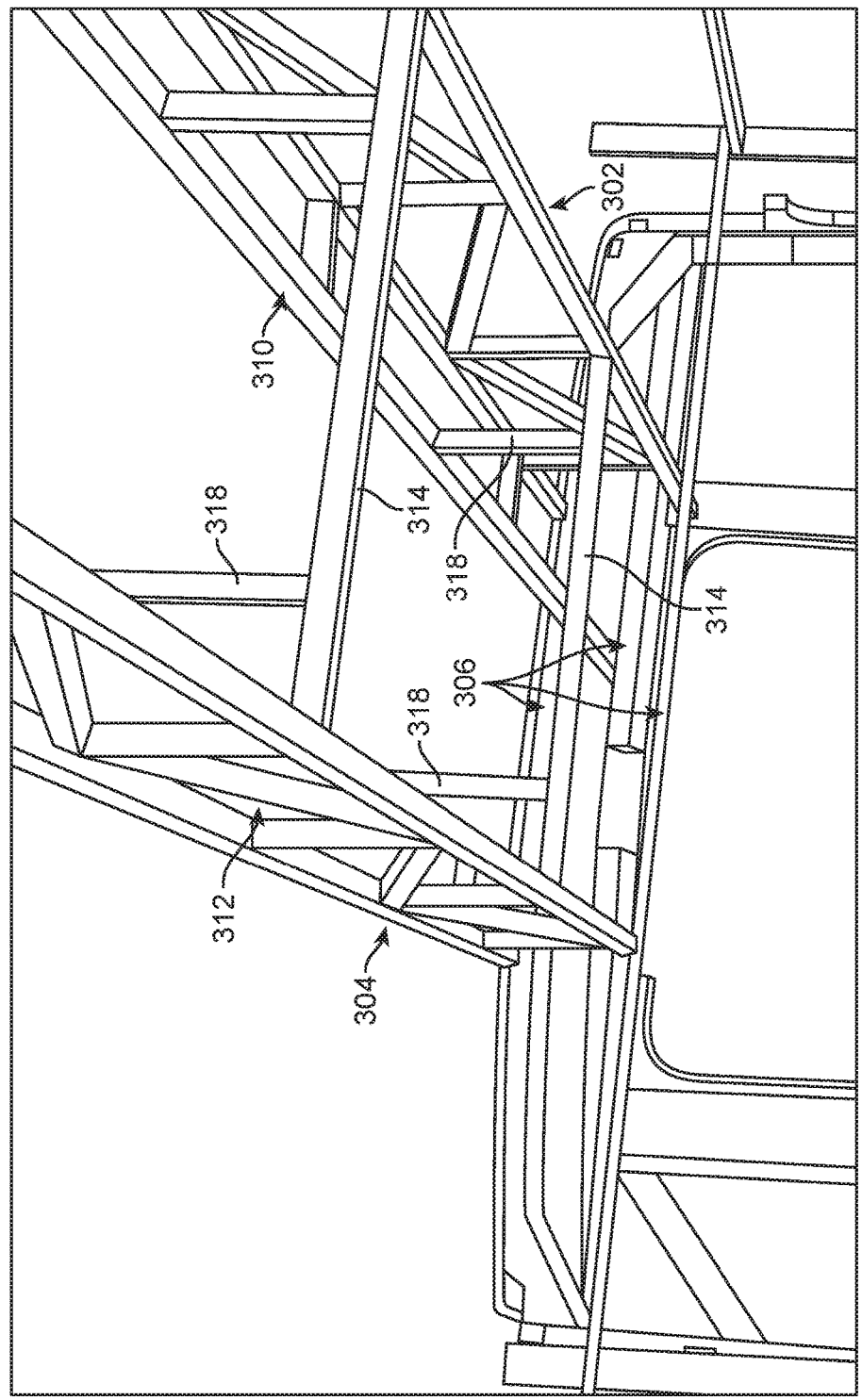
Figure 3D:
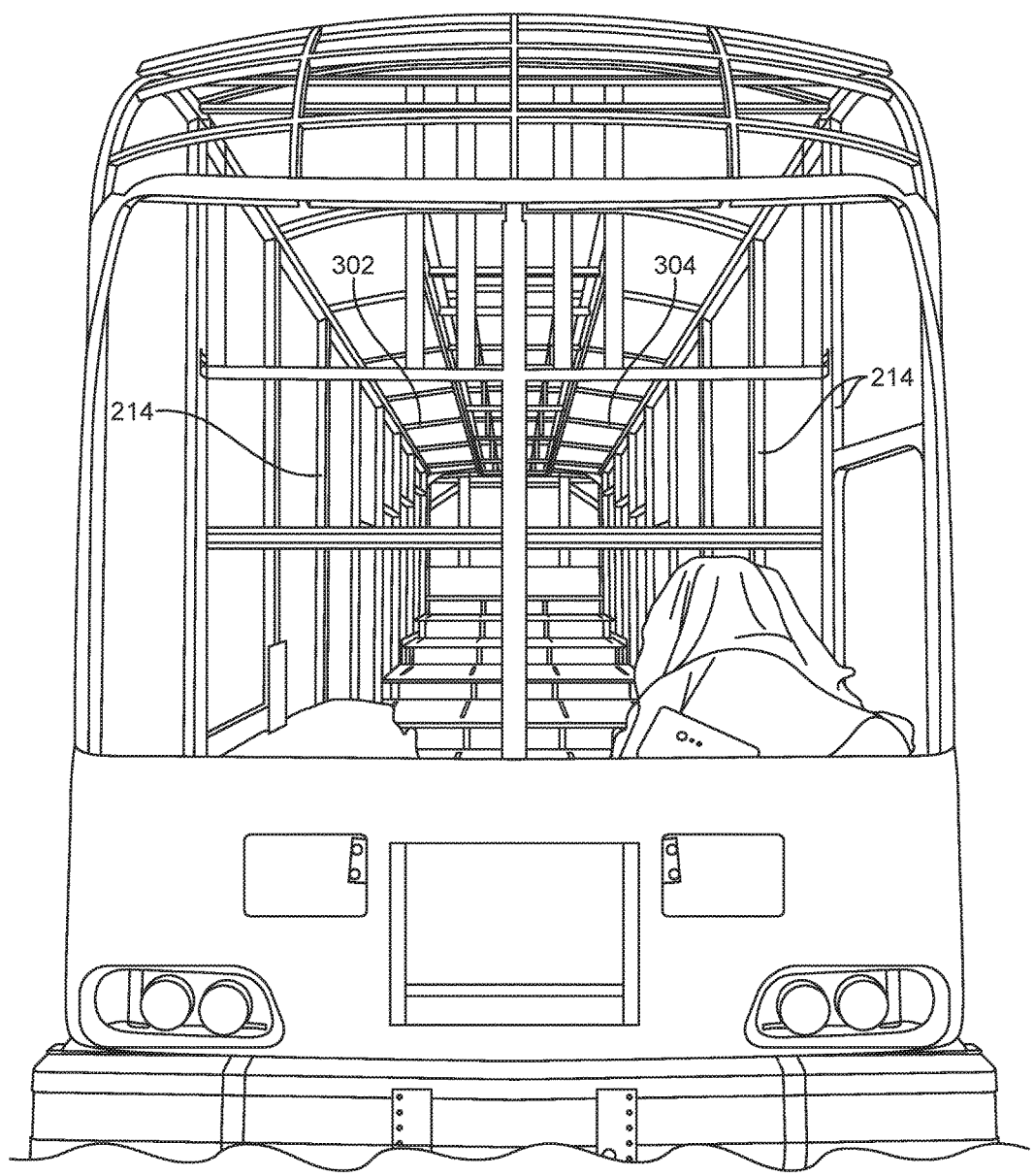
Figure 3E:
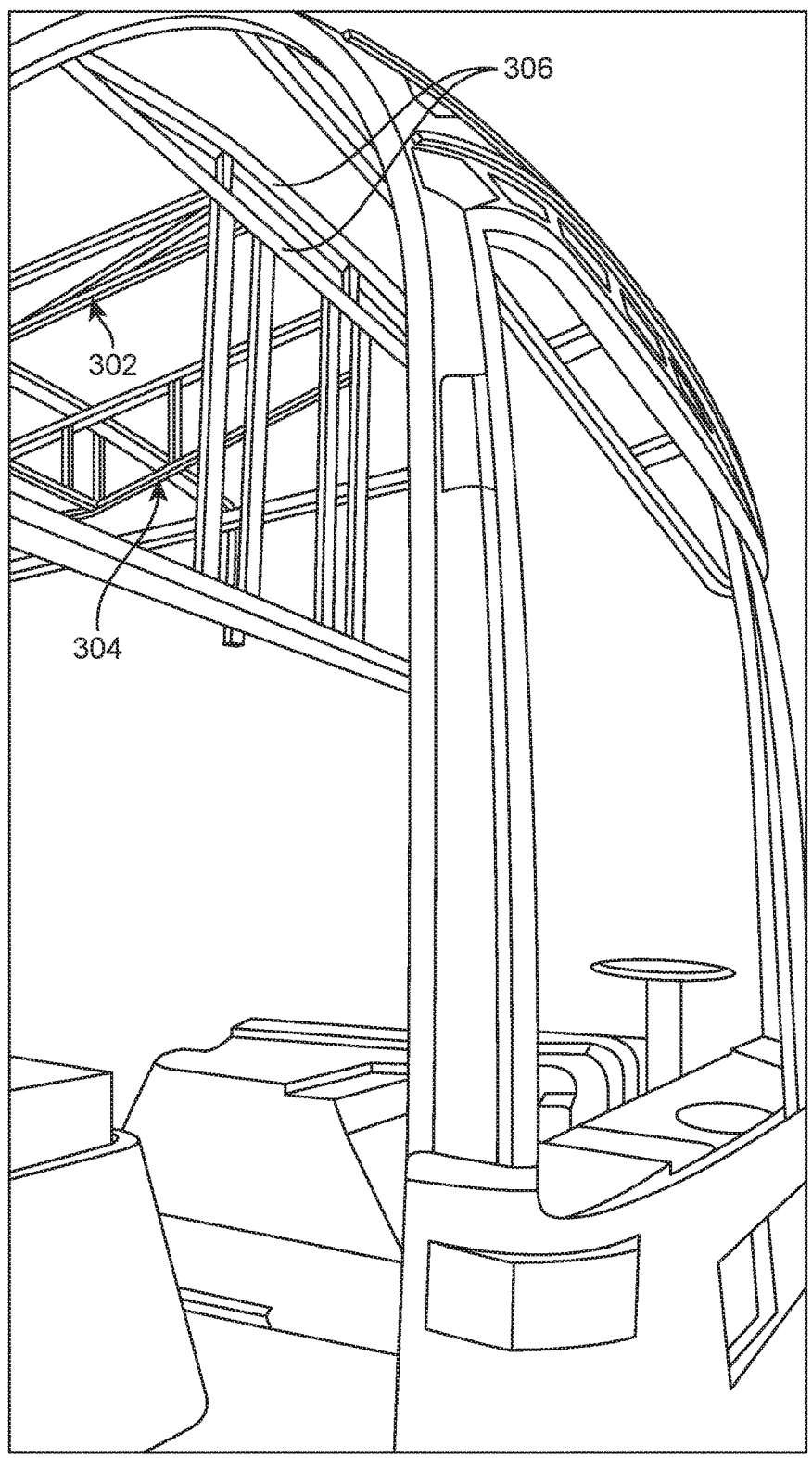
Figure 3F:
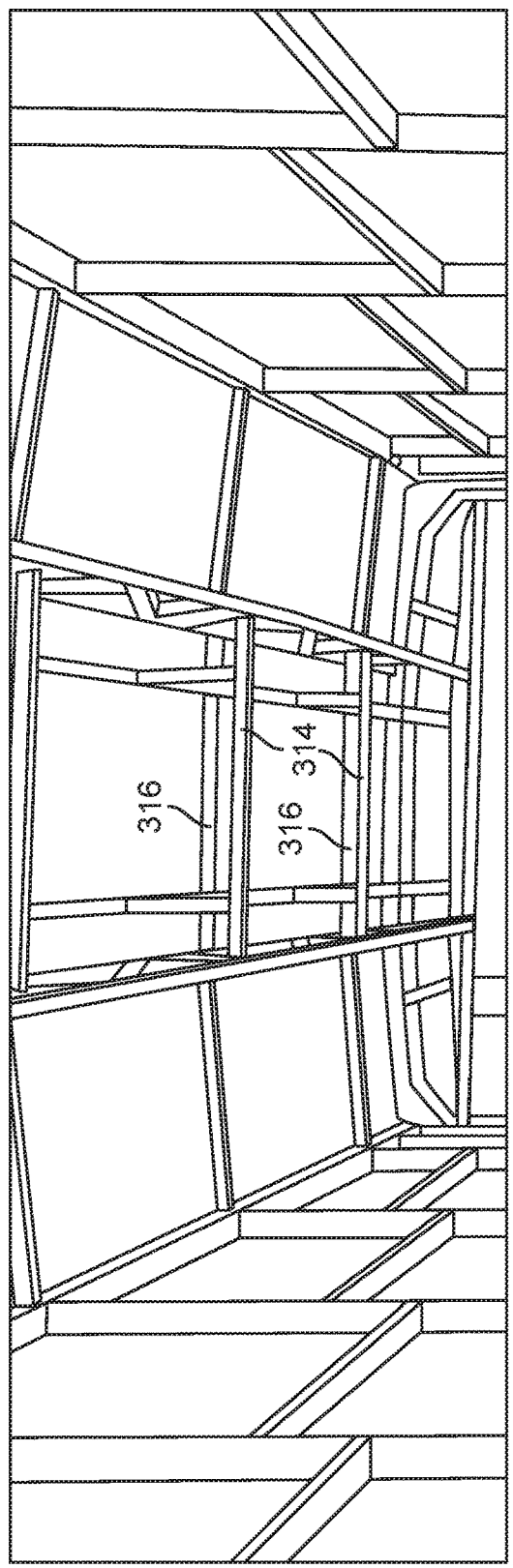
Figure 3H:
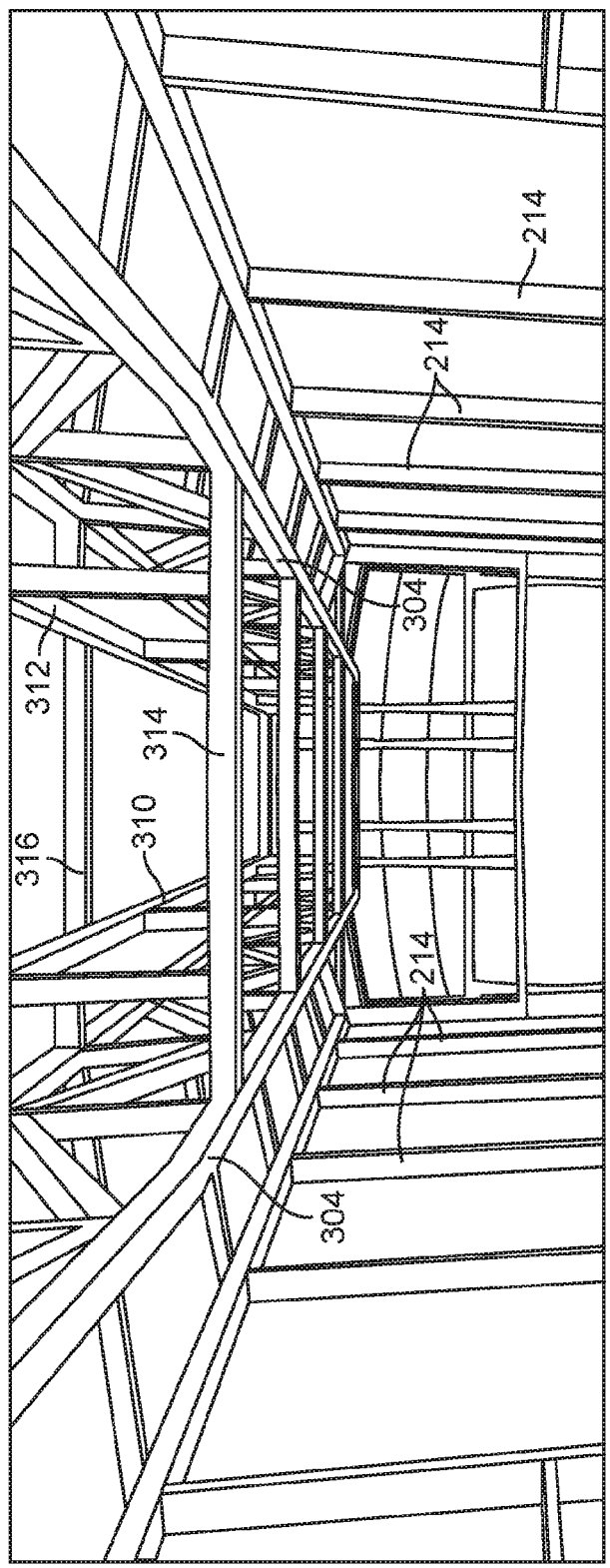
Figure 3I:
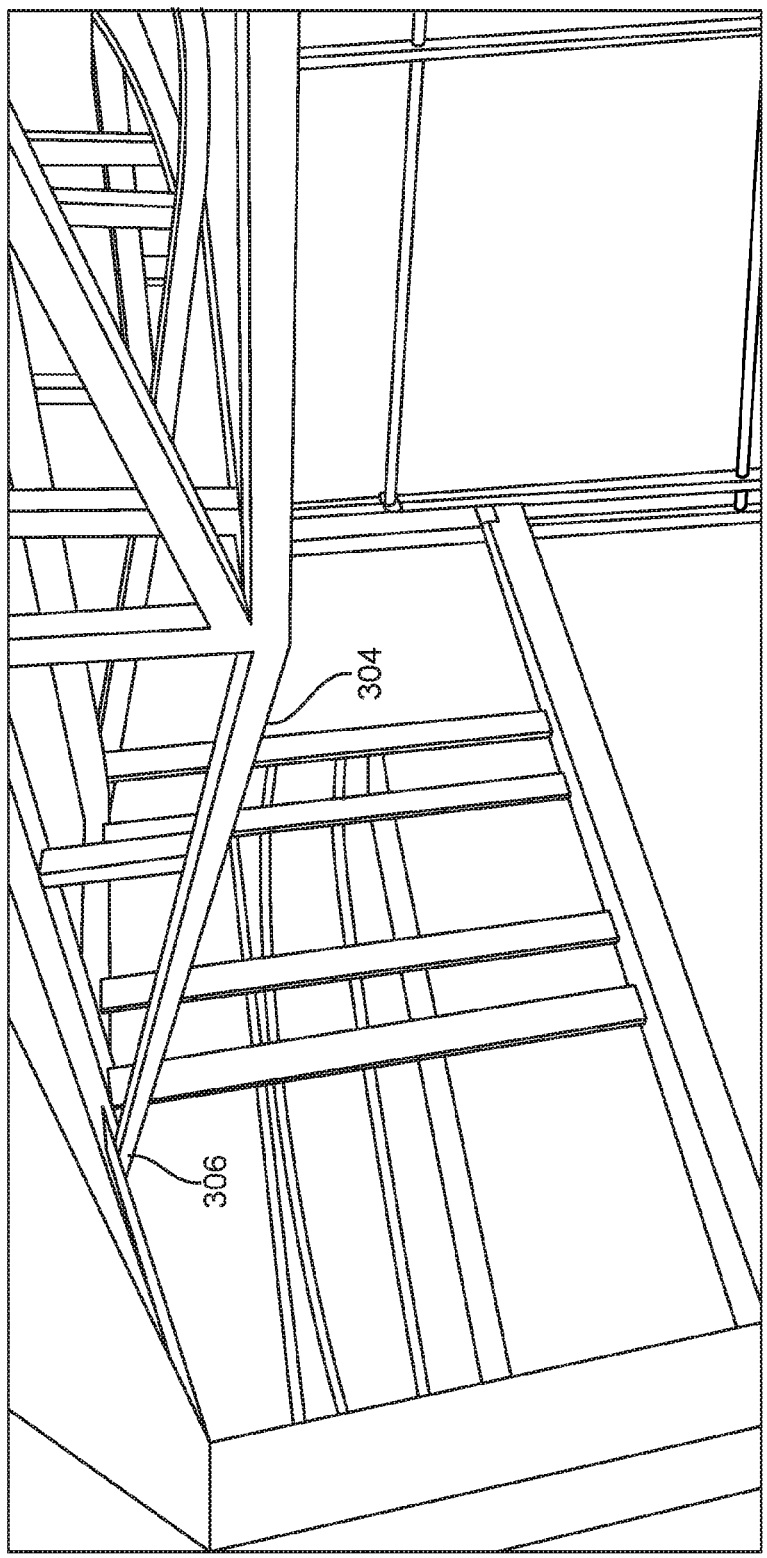
Figure 3J:
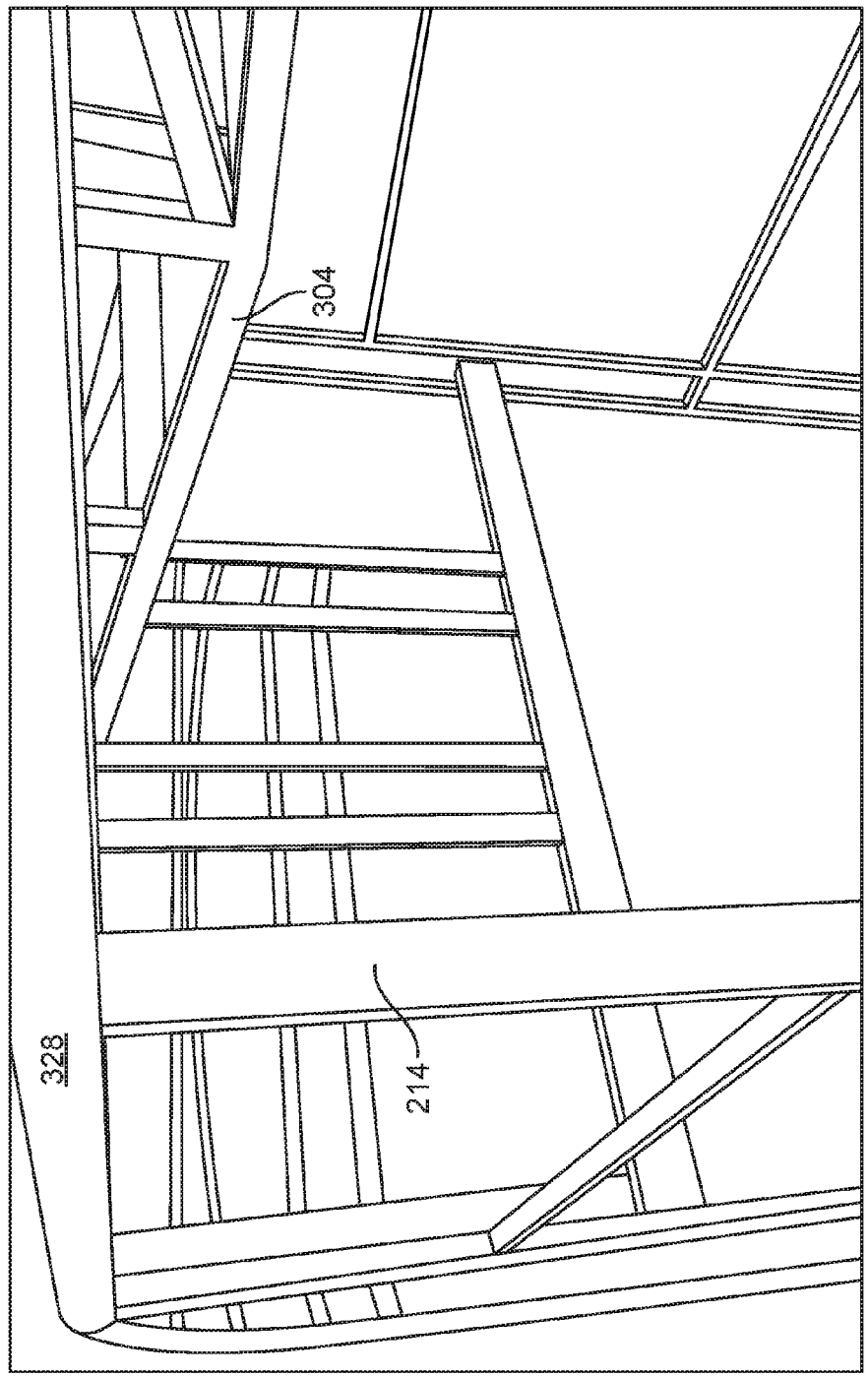
Figure 3K:
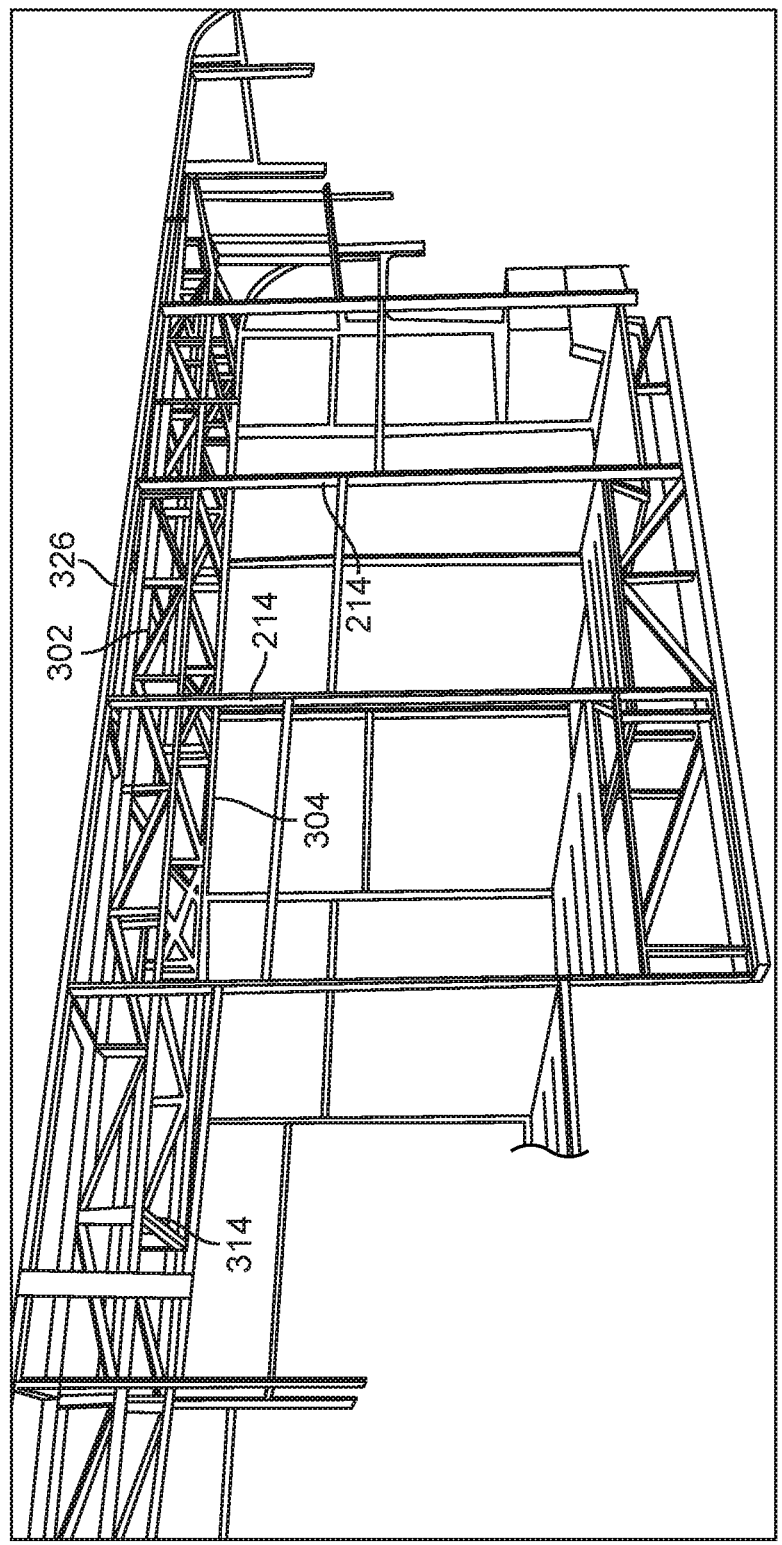
Figure 3L:
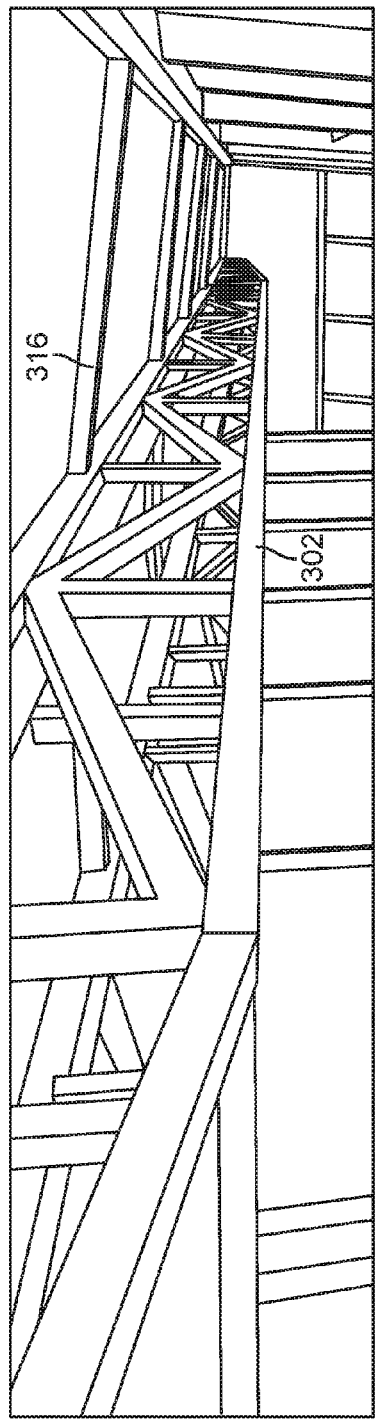
Figure 3M:
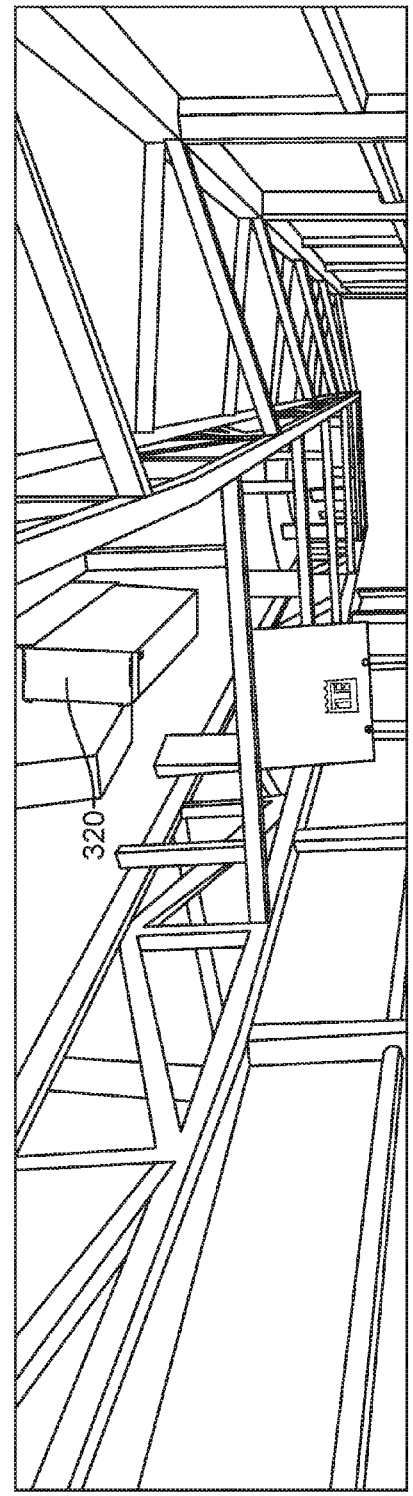
Figure 3N:
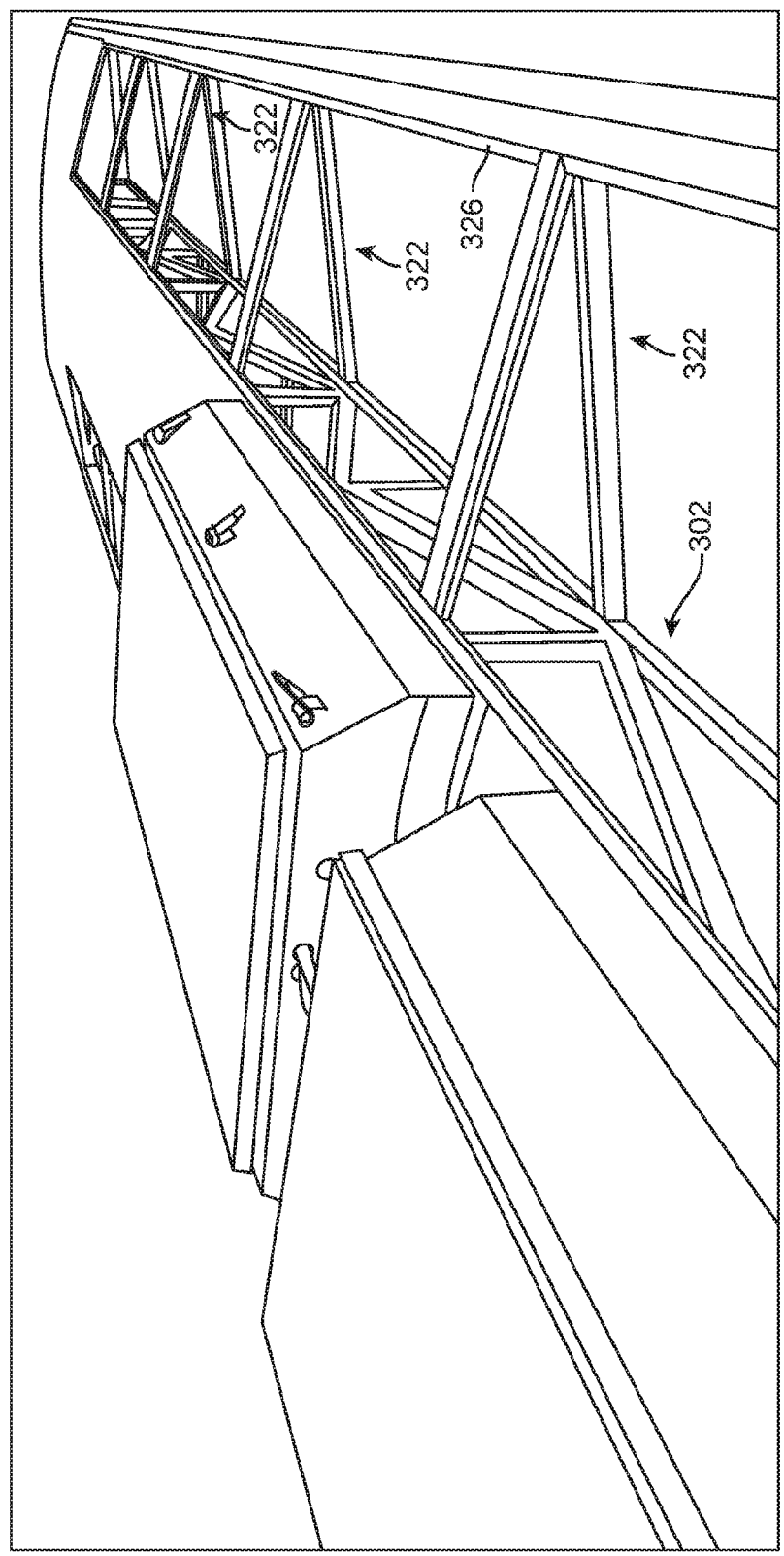
Figure 3O:
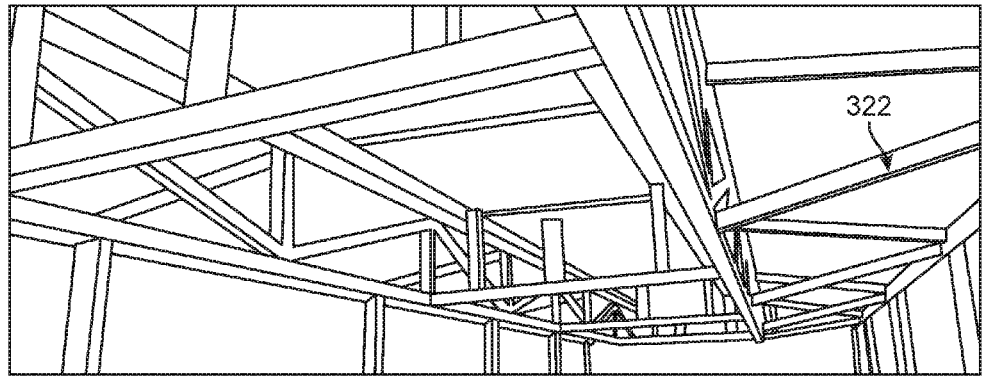
Figure 3P:
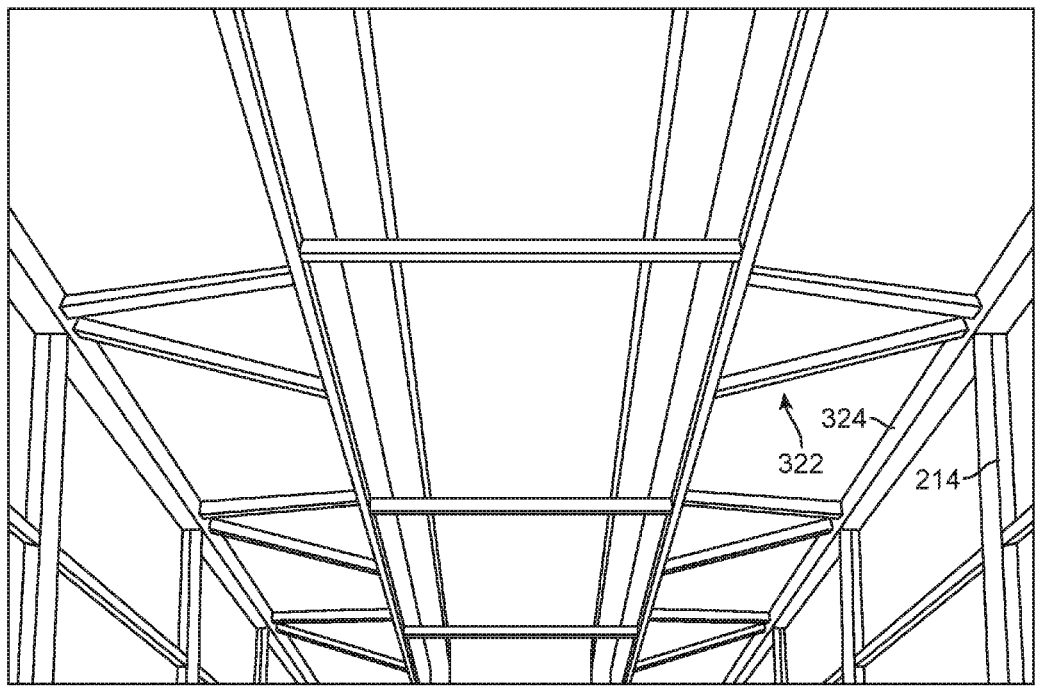
Figure 3R:
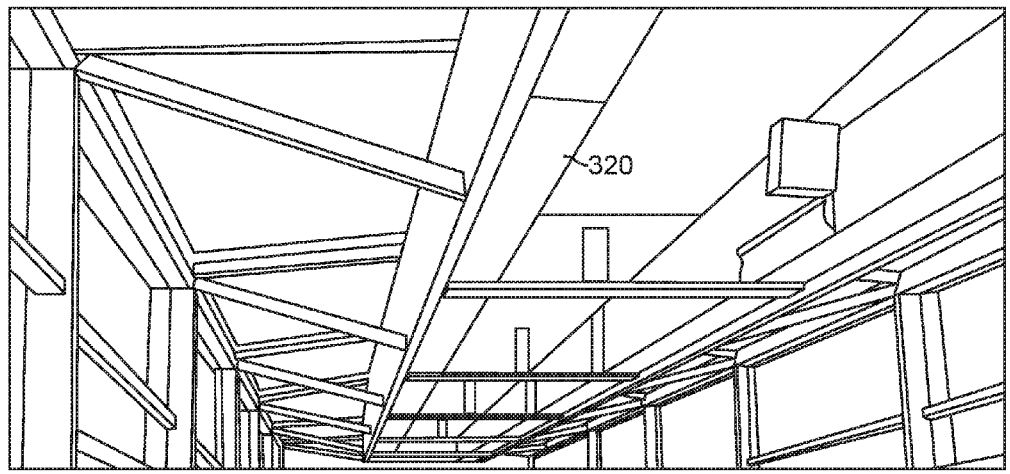
Figure 3S:
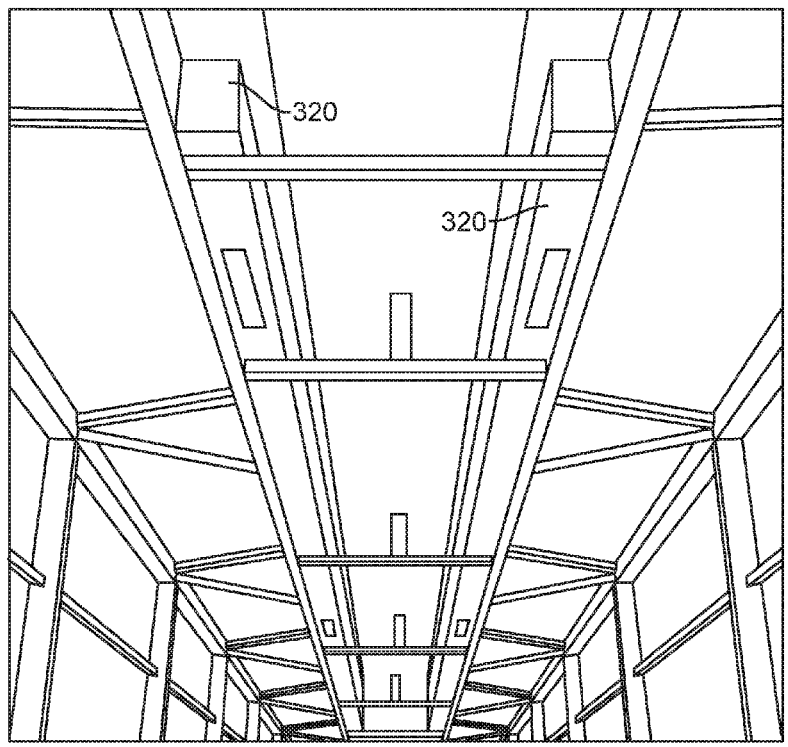
Figure 3T:
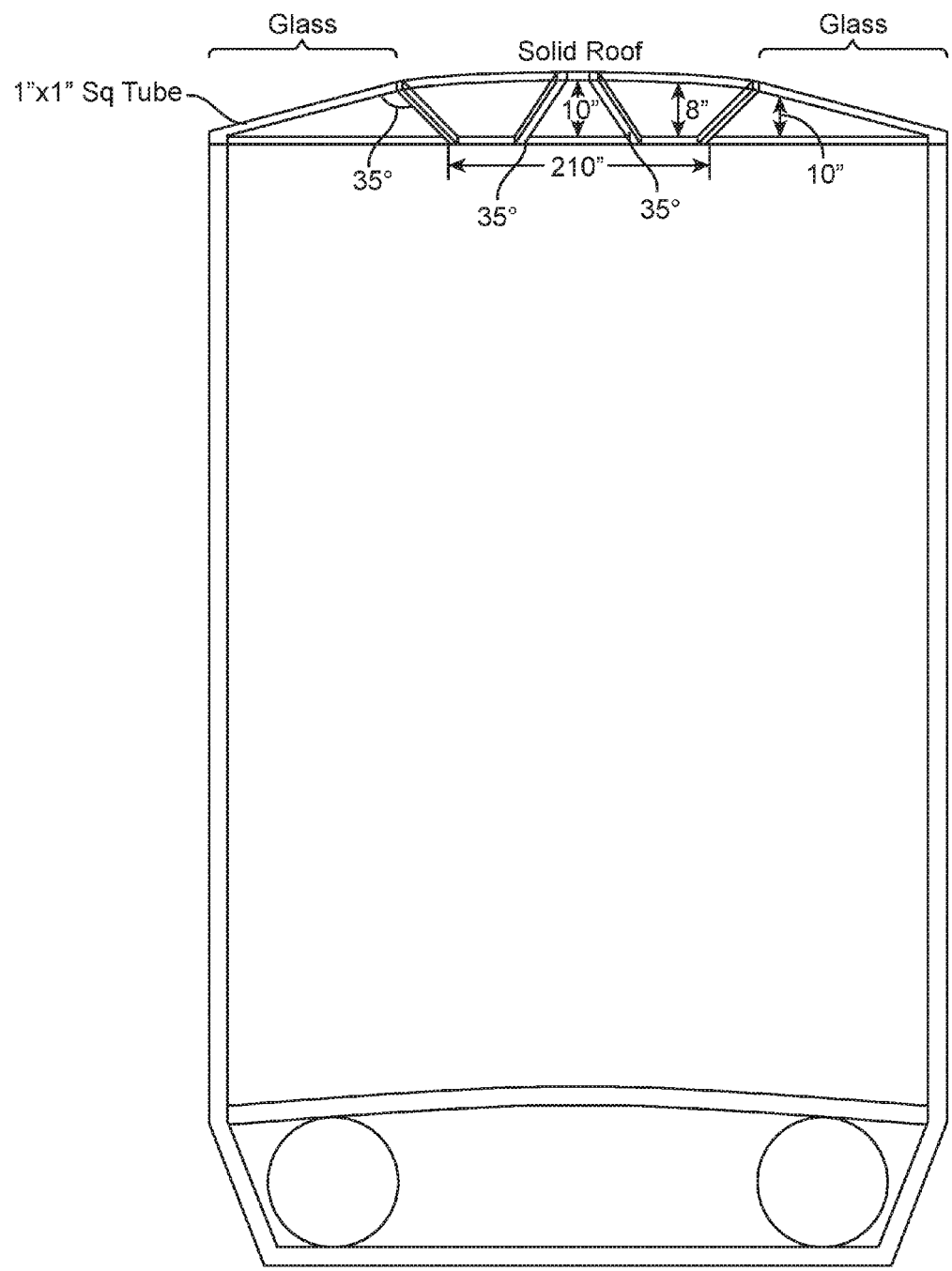

FIGS. 3A to 3T are non-limiting, exemplary illustrations of a roof support framework in accordance with one or more embodiments of the present invention. The roof support framework provides structural integrity for vehicle roof 118 without the need or use of any interior pillars in the interior of vehicle 100 to support roof 118 and further, enables the use of smaller or narrower lateral vertical vehicle frame posts 214 for a wider lateral views by using larger windows. Roof support framework also enables the actual roof 118 to be at a higher position (over 13 ft). Further, the middle positioning of the roof support framework enables use of lateral rooftop windows 232 (at lateral sections 134 and 138), while supporting AC unit 166 in middle section 136.

As illustrated, the roof support frame structure is comprised of framework of lattices 302, 304, 310, 312 that extend longitudinally along length 170 of vehicle 100 and are connected to front and rear transversely oriented frame structures 306, 308 of vehicle 100, in addition to lateral frame members 326 and 328. In this non-limiting, exemplary instance, framework of lattices 302, 304, 310, 312 may be positioned at middle section 136 of roof 118, with each individual lattice 302, 304, 310, 312 connected together by a plurality of transversely extending bars 314, 316 on top and or bottom.

In general, the longitudinally extending lateral lattices 302, 304 are preferably trusses, where as the longitudinally extending lattices 310, 312 are latter lattices. Further included in the roof support frame structure (or the framework) are vertically extending bars 318 that in addition to providing added strength for lattices 310 and 312 also support the AC plenum or air duct 320 (best shown in FIGS. 3M, 3Q to 3S). It should be noted that the air duct may comprise of any profile configuration (e.g., cylindrical with rounded or circular profile) and need not be limited to rectangular.

As further illustrated, the framework of lattices 302, 304, 310, 312 are further connected to lateral horizontal vehicle frame bars 324 and lateral vertical vehicle frame posts 214 by triangular supports 322 along the longitudinal length of the entire lattices 302, 304, 310, 312, with the entirety of all connections constituting the roof support frame structure. Although the inner portion of triangular support 322 are covered with solid material it is preferable to have transparent or visible portion to not block the persons view.

Although the invention has been described in considerable detail in language specific to structural features and or method acts, it is to be understood that the invention defined in the appended claims is not necessarily limited to the specific features or acts described. Rather, the specific features and acts are disclosed as exemplary preferred forms of implementing the claimed invention. Stated otherwise, it is to be understood that the phraseology and terminology employed herein, as well as the abstract, are for the purpose of description and should not be regarded as limiting. Further, the specification is not confined to the disclosed embodiments. Therefore, while exemplary illustrative embodiments of the invention have been described, numerous variations and alternative embodiments will occur to those skilled in the art. As an example, the tier architecture need not be based on steps, but may be implemented by use of a ramp type platform. As another example illustrated in FIG. 3T, the roof plenum may be changed to a shape that permits better viewing through the roof windows for people sitting on a side wishing to look through the roof window on the opposite side of the vehicle to where they are sitting. For example, as illustrated, the shape of the plenum may be triangulated (while maintaining the same trellis structure) so that the lower part of the plenum is narrower than the top of the plenum. As shown in FIG. 3T, this narrow part of the plenum allows a better angle of site for passengers wishing to look up. Such variations and alternate embodiments are contemplated, and can be made without departing from the spirit and scope of the invention.

It should further be noted that throughout the entire disclosure, the labels such as left, right, front, back, top, inside, outside, bottom, forward, reverse, clockwise, counter clockwise, up, down, or other similar terms such as upper, lower, aft, fore, vertical, horizontal, oblique, proximal, distal, parallel, perpendicular, transverse, longitudinal, etc. have been used for convenience purposes only and are not intended to imply any particular fixed direction, orientation, or position. Instead, they are used to reflect relative locations/positions and/or directions/orientations between various portions of an object.

In addition, reference to "first," "second," "third," and etc. members throughout the disclosure (and in particular, claims) is not used to show a serial or numerical limitation but instead is used to distinguish or identify the various members of the group.

In addition, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of," "act of," "operation of," or "operational act of" in the claims herein is not intended to invoke the provisions of 35 U.S.C. 112, Paragraph 6.

What is claimed is:

1. A vehicle, comprising:
    a roof having three longitudinally extending sections, comprising:
    two lateral sections comprised of windows; and
    a middle section that includes roof support structure;
    wherein: the two lateral sections enable unobstructed overhead views;
    the roof includes:
    a roof support frame structure comprising:
    framework of lattices that extend longitudinally along a length of the vehicle and are connected to front and rear transversely oriented frames of the vehicle;
    the framework of lattices comprise two lateral lattices positioned at the middle portion of the roof, with each individual lattice connected together by a plurality of transversely extending bars on top and bottom.

2. The vehicle as set forth in claim 1, wherein:
    the longitudinally extending lateral lattices are trusses.

3. The vehicle as set forth in claim 1, wherein:
    the roof support frame structure include vertically extending bars that in addition to providing added strength also support a plenum.

4. The vehicle as set forth in claim 3, wherein:
    the framework of lattices are further connected to vertical frames of the vehicle by triangular supports along a length of the entire lattices, with the entirety of all connections constituting the support rooftop frame structure.

5. The vehicle as set forth in claim 1, further comprising:
    seating deck support frame structure to provide an interior floor that is tiered upward in a series of steps from a front of the vehicle toward a rear of the vehicle, forming a series of progressively elevated decks.

6. The vehicle as set forth in claim 5, wherein:
    a deck is comprised of a set of generally vertically oriented posts on top of which are mounted a set of generally horizontal crossbars.

7. The vehicle as set forth in claim 6, wherein:
    varying a height of the set of generally vertically oriented posts per deck varies an elevation of a particular deck.

8. The vehicle as set forth in claim 7, wherein:
the deck is comprised of both longitudinally and transversely extending horizontal bars that are generally parallel a longitudinal and a traverse axis of the vehicle.

9. The vehicle as set forth in claim 8, wherein:
vertically oriented posts support both longitudinally and transversally extending horizontal bars.

10. The vehicle as set forth in claim 9, wherein:
a front row vertical posts of each deck is slanted at an angle.

11. The vehicle as set forth in claim 9, wherein:
slanted angle posts enable a front portion the deck of an elevated flooring to be tilted to prevent potential falls while stepping up to a next higher elevated deck.

12. The vehicle as set forth in claim 6, wherein:
the deck further includes lateral frames.

13. The vehicle as set forth in claim 12, wherein:
the lateral frames comprise of truss structures connected to lateral vertical vehicle frame posts of vehicle.

14. The vehicle as set forth in claim 13, wherein:
lateral frames are connected to the lateral vertical vehicle frame posts of vehicle as well as horizontal bars of decks.

15. The vehicle as set forth in claim 13, wherein:
deck support frame structure includes seat support tracks.

16. The vehicle as set forth in claim 15, wherein:
seat support tracks are positioned on top of the longitudinally extending bars of the deck support frame structure.

17. The vehicle as set forth in claim 16, wherein:
seats are secured on the seat support tracks at a desired track position along front-back of the deck.

18. The vehicle as set forth in claim 17, wherein:
deck support frame structure further includes lateral drainage channels, extending longitudinally and angled to drain off.

19. A vehicle, comprising:
a roof having three longitudinally extending sections, comprising:
two lateral sections comprised of windows; and
a middle section that includes roof support structure;
wherein: the two lateral sections enable unobstructed overhead views; and
a seating deck support frame structure to provide an interior floor that is tiered upward in a series of steps from a front of the vehicle toward a rear of the vehicle, forming a series of progressively elevated decks;
with a deck comprised of a set of generally vertically oriented posts on top of which are mounted a set of generally horizontal crossbars.

* * * * *